US00RE41082E

(19) United States
(12) Reissued Patent
Kanai et al.

(10) Patent Number: US RE41,082 E
(45) Date of Reissued Patent: Jan. 19, 2010

(54) INFORMATION RECORDER, RECORDING METHOD, AND RECORDING MEDIA

(75) Inventors: Yuichi Kanai, Aichi (JP); Kazuya Ogawa, Gifu (JP); Seiya Ota, Aichi (JP)

(73) Assignee: Sanyo Electric Co., Ltd., Moriguchi-Shi (JP)

(21) Appl. No.: 11/580,314

(22) PCT Filed: Jan. 29, 1999

(86) PCT No.: PCT/JP99/00385

§ 371 (c)(1),
(2), (4) Date: Oct. 4, 1999

(87) PCT Pub. No.: WO99/40586

PCT Pub. Date: Aug. 12, 1999

Related U.S. Patent Documents

Reissue of:
(64) Patent No.: 6,816,666
Issued: Nov. 9, 2004
Appl. No.: 09/402,344
Filed: Jan. 29, 1999

(30) Foreign Application Priority Data

Feb. 3, 1998 (JP) ..... 10-21685

(51) Int. Cl.
*H04N 5/93* (2006.01)

(52) U.S. Cl. ..... 386/52; 386/55
(58) Field of Classification Search ..... 386/52, 386/55, 46, 124, 125, 95, 45, 40
See application file for complete search history.

(56) References Cited

U.S. PATENT DOCUMENTS 5,933,570 A 8/1999 Fujita
6,118,927 A 9/2000 Kikuchi et al.

FOREIGN PATENT DOCUMENTS

EP 0 655 740 A1 5/1995
EP 0655740 A1 5/1995

(Continued)

OTHER PUBLICATIONS

Decision of final rejection for the Japanese counterpart—Patent Application No. Hei11–540252, dated Jul. 10, 2007.
Notice of Reason for Rejection on the Japanese application (JP2006–303541), and English translation.
Notice of Reasons for Rejection from the Japanese Patent Office, dated Apr. 22, 2008, corresponding to Japanese Application No. JP2006–303541.
Two Notice of Rejections dated Oct. 31, 2006 and Feb. 20, 2007, respectively, for the Japanese counterpart application No. JPH11–0540252, with English translations.
Office Actions from the European Patent Office dated Sep. 17, 2003, and Feb. 23, 2007 in the corresponding European Patent Application No. 99 901 913.6.
Notification of Reasons for Refusal, dated Jul. 15, 2008, on the Japanese counterpart patent application No. 2006–303541.

*Primary Examiner*—Robert Chevalier
(74) *Attorney, Agent, or Firm*—Westerman, Hattori, Daniels & Adrian, LLP

(57) ABSTRACT

There are described a data recording system, a data recording method, and a recording medium, all of which are directed to enabling easy editing of AV data without involvement of duplication of the AV data, as well as to eliminating a necessity for an additional data recording region. In the recording system, at the time of recording of primary data, there is prepared an original file which stores link data formed by arranging in sequence address data for reproduction purposes stored in a recording region on a recording medium. Further, through editing of the original file, there is prepared a virtual file which stores link data formed by arranging in sequence address data for reproduction purposes stored in the recording region on the recording medium. The data are reproduced according to these files.

35 Claims, 20 Drawing Sheets

U.S. PATENT DOCUMENTS

| | | | |
|---|---|---|---|
| EP | 0 684 570 | A1 | 11/1995 |
| EP | 0684570 | A1 | 11/1995 |
| EP | 0737979 | A2 | 10/1996 |
| EP | 0 737 979 | A2 | 10/1996 |
| EP | 0 801 391 | A2 | 10/1997 |
| EP | 0801391 | A2 | 10/1997 |
| JP | 6-28773 | | 2/1994 |
| JP | 6-303557 | | 10/1994 |
| JP | H07-147661 | | 6/1995 |
| JP | 7-325801 | | 12/1995 |
| JP | 8-339665 | A | 12/1996 |
| JP | 8-339665 | | 12/1996 |
| JP | 9-153273 | A | 6/1997 |
| JP | 9-153273 | | 6/1997 |
| JP | 09-167444 | | 6/1997 |
| JP | 09-259573 | | 10/1997 |
| JP | 10-64247 | | 3/1998 |
| WO | PCT96/02805 | | 9/1996 |

AT THE TIME OF RECORDING

AT THE TIME OF EDITING

AT THE TIME OF DELETION (OF ENTIRE TITLE) (FIRST DELETING METHOD)

AT THE TIME OF DELETION (OF PORTION OF TITLE) (FIRST DELETING METHOD)

AT THE TIME OF DELETION (OF ENTIRE TITLE) (SECOND DELETING METHOD)

AT THE TIME OF DELETION (OF PORTION OF TITLE) (SECOND DELETING METHOD)

- ZERO-TH TITLE FILE (C1~C10) (ORIGINAL FILE)
- FIRST TITLE FILE (C6~C8) (VIRTUAL FILE)
- SECOND TITLE FILE (C3~C6)

INFORMATION RECORDER, RECORDING METHOD, AND RECORDING MEDIA

Matter enclosed in heavy brackets [ ] appears in the original patent but forms no part of this reissue specification; matter printed in italics indicates the additions made by reissue.

FIELD OF THE INVENTION

The present invention relates to a data recording system, a data recording method, and a recording medium.

BACKGROUND ART

In a conventional video system, recorded audio-visual (AV) data are edited through the following processes. The video system employs a reproduction system for reproducing the recorded AV data and a recording system for recording the AV data reproduced by the reproduction system. Desired portions of the AV data are recorded on the recording system while the AV data are reproduced by the reproduction system. For example, when an attempt is made to create a digest of certain AV data, the AV data are edited through the processes mentioned above. For example, as shown in FIG. 21, when an attempt is made to create a new video file from a portion of a first video file including first video data and a portion of a second video file including second video data, there is a necessity for producing a duplicate of the corresponding portion of the first video file and a duplicate of the corresponding portion of the second video file.

According to the standards for an existing mini disk (MD), audio data are not recorded on a track in adjacent locations but are discretely recorded on the track in recording units, each comprising a predetermined amount of data. In order to reproduce a string of data from the discrete data sets, there is provided a management table for use in linking the discrete data sets together. The reproduction system accesses the discrete data in the sequence written in the management table, to thereby enable reproduction of sequential sound.

In the above-described conventional video system, editing of recorded AV data involves use of two VCRs. Further, since AV data must be duplicated while editing, an additional recording area for recording the duplicate of the AV data is required.

According to the existing MD standards, each of the linked data sets assumes a predetermined amount of recorded data, and only a single management table is assigned to a mini disk. If other data are overwritten on a disk on which data have already been recorded, the existing management table must be rewritten. Thus, only single link data are available. For these reasons, in order to edit data, the data must be duplicated as in the conventional video system. A significant problem is not encountered in a case where there is little necessity for editing data, such as the case of an MD. In contrast, in the case of AV data, it is expected that there is an increasing user demand for creating a digest of certain AV data.

Further, the conventional file system can share a file but cannot share a portion of a file.

The present invention is directed to an system and method for enabling easy editing of AV data. Particularly, the object of the present invention is to provide a data recording system, a data recording method, and a recording medium, wherein AV data can be readily edited without involvement of duplication of the AV data and without a necessity for an addition data recording area.

SUMMARY OF THE INVENTION

The present invention has been conceived to solve the foregoing problem. According to a first aspect of the present invention, there is provided a data recording system for recording primary data, comprising:

a recording section for recording primary data; and a control section which generates an original file at the time of recording of the primary data, and a virtual file through editing of the original file, wherein the original file stores link data which are formed by arranging in sequence address data for reproduction purposes stored in a recording region on a recording medium, and the virtual file stores link data which are formed by arranging in sequence address data for reproduction purposes stored in the recording region on the recording medium.

In this data recording system, when the recording section records primary data, the control section generates an original file. Further, through editing of the original file, a virtual file is prepared. Through use of the virtual file having the edited link data stored thereon, a plurality of files can access at least a portion of the primary data. As a result, for example, editing of the primary data, such as preparation of a digest of the primary data, becomes feasible, thereby eliminating a necessity for use of two VCRs. Further, the primary data are managed in the form of only files, thus eliminating a necessity for ensuring a region for use in recording a duplicate of the primary data.

According to a second aspect of the present invention, the control section prepares a virtual file by editing the original file and/or the virtual file. A virtual file can be formed not only from the original file but also from another virtual file.

According to a third aspect of the present invention, there is provided a data recording system for storing primary data, comprising:

a recording section for recording primary data; and a control section for preparing a file at the time of recording of the primary data, wherein the file stores, in the form of a logical address, link data which are formed by arranging in sequence address data for reproduction purposes stored in a recording region on a recording medium.

In this data recording system, the file is prepared when the recording section records the primary data. As a result of a new file being prepared by editing the file, editing or reproduction of the primary data; for example, preparation of a digest of the primary data, becomes feasible, thereby eliminating a necessity for use of two VCRs. Further, there is eliminated a necessity for ensuring a region for use in recording a duplicate of the primary data.

According to a fourth aspect of the present invention, the control section edits the original file that is prepared at the time of recording of the primary data, thereby resulting in preparation of a new file; that is, a virtual file. Further, a new virtual file is prepared by editing an existing original file and/or an existing virtual file. Reserving of the thus-prepared virtual file enables editing of the primary data; for example, preparation of a digest of the primary data.

According to a fifth aspect of the present invention, the virtual file comprises at least a portion of address data pertaining to a file which is used as a source for editing.

According to a sixth aspect of the present invention, the control section prepares a new file on the basis of a plurality of files. A new single file can be prepared through editing of a plurality of files.

According to a seventh aspect of the present invention, the address data correspond to address data stored in respective unit recording regions which are formed by dividing the recording medium into a plurality of recording regions.

According to an eighth aspect of the present invention, when any of existing files is deleted, the control section deletes the file. When a portion of any one of existing files is deleted, the control section deletes from the file one or a plurality of address data sets pertaining to the file. In this way, any one of existing files or a portion of thereof can be deleted by deletion of only one or a plurality of address data sets pertaining to the file.

According to a ninth aspect of the present invention, the control section prepares a link count table for managing the number of times files refers to each of unit recording regions into which the recording region on the recording medium is divided. Further, the control section updates data pertaining to the prepared link count table or pertaining to a link count table read from the recording medium, through editing and/or deletion of the files. Reserving the link count table enables management of the respective unit recording regions. For example, the unit recording region assigned reference number 0 can be released as a recordable region.

According to a tenth aspect of the present invention, the unit recording region assigned reference number 0 in the link count table is handled as a recordable region. When the original file prepared at the time of recording of the primary data or a portion of the original file is deleted, the control section resets to zero the reference number assigned in the link count table to the corresponding unit recording regions to be deleted. In contrast, when the virtual file prepared by editing the existing file or a portion of the virtual file is deleted, the control section decrements the reference number assigned in the link count table to the corresponding unit recording regions to be deleted. As a result, there can be performed processing required for distinguishing the original file from the virtual file, processing for handling the virtual file as being in a hierarchy level lower than the original file, and processing for deleting the virtual file.

According to an eleventh aspect of the present invention, when a certain original file or a portion of the original file is deleted, another virtual file referring to the corresponding unit recording region to be deleted is corrected. As a result of correction of another virtual file, another virtual file referring to the corresponding unit recording region to be deleted can be prevented from being affected by deletion of the certain original file.

According to a twelfth aspect of the present invention, the unit recording region assigned reference number 0 in the link count table is handled as a recordable region. When a certain file is wholly or partially deleted, the control section decrements the reference number assigned in the link count table to the corresponding unit recording regions to be deleted, regardless of whether the file to be deleted is an original file prepared at the time of recording of primary data or a virtual file prepared by editing an existing file. As a result, there can be performed processing required for executing a deleting operation, wherein the original file and the virtual file are handled as being of the same hierarchical level.

According to a thirteenth aspect of the present invention, when overwriting of the entirety of a certain existing file or overwriting of a portion of the file is instructed, the control section prepares a new file with regard to the thus-overwritten primary data, and corrects the link data stored in the existing files or deletes the existing files. As a result, processing required for performing an overwriting operation can be carried out.

According to a fourteenth aspect of the present invention, the control section prepares a title set file for storing the address data pertaining to the files and corrects the title set file in response to preparation or deletion of the files.

Reserving of the title set file enables management of the respective files and provides immediate access to the link data pertaining to the respective files.

According to a fifteenth aspect of the present invention, the data recording system writes at predetermined timing into the recording medium data pertaining to the generated, corrected, and deleted files, data pertaining to the link count table, and data pertaining to the title set file. At the time of reproduction of the recorded primary data, the data pertaining to the files, the data pertaining to the link count table, and the data pertaining to the title set file are read from the recording medium, and the primary data can be reproduced according to the thus-read data.

According to a sixteenth aspect of the present invention, the data recording system reads from the recording medium data pertaining to the files, data pertaining to the link count table, and data pertaining to the title set file, all of which are written into the recording medium by the data recording system, and stores the thus-read data into a storage section of the data recording system. As a result, the primary data can be reproduced according to the data pertaining to the files, the data pertaining to the link count table, and the data pertaining to the title set file, all the data sets being stored in the storage section.

According to a seventeenth aspect of the present invention, the data recording system records primary data on and reproduces primary data from unit recording regions which are formed by dividing a recording region on a recording medium into a plurality of sub-divisions. Data pertaining to a reproduction start frame and a reproduction end frame of each unit recording region are stored in the file. Even when the data are recorded or reproduced on a per-unit-recording-region basis, data can be edited from an arbitrary position (frame).

According to an eighteenth aspect of the present invention, the data recording system records primary data on and reproduces primary data from unit recording regions which are formed by dividing a recording region on a recording medium into a plurality of sub-divisions. Given that the minimum rate at which the data recording system transfers data to the recording medium is Be, a bit rate at which data are reproduced is Bd, a time required from the time a head has made a maximum jump over the recording medium to the time first actual data are acquired is Tw, and the amount of data stored on the unit recording region is C, recording or reproduction of data is performed so as to satisfy the relational expressions $(Be-Bd)*Ts>Bd*Tw$, $Ts=C/Be$, and $Be>Bd$. In this data recording system, according to the above relational expressions, data having the amount of $(Be-Bd)Ts$ are stored during period Ts. The thus-stored data are greater in amount than data in the amount of $Bd*Tw$ and are reproduced in Tw, which is a time required from the time a head has made a maximum jump over the recording medium to the time first actual data are acquired. Even if the head makes a jump between the inner periphery and the outer periphery of the recording medium, the data can be stably recorded or reproduced without interruption.

According to a nineteenth aspect of the present invention, there is provided a data recording method for recording primary data on a recording medium, comprising:

a step of generating link data by arranging in sequence address data for reproduction purposes stored in a recording region on the recording medium;

a step of editing existing link data, to thereby generate link data which differ from the existing link data and sequentially comprises address data for reproduction; and a step of recording the respective link data sets on the recording medium.

Through use of the edited link data, a plurality of link data sets can access at least a portion of the primary data. As a result, for example, editing of the primary data, such as preparation of a digest of the primary data, becomes feasible, thereby eliminating a necessity for use of two VCRs and a necessity for ensuring a region for use in recording a duplicate of the primary data.

According to a twentieth aspect of the present invention, there is provided a method of discretely recording primary data on a recording medium, wherein new link data for linking together recording packets according to the recording of the primary data are prepared separately from the existing link data, and the new link data are recorded on the recording medium together with the existing link data. As a result, various programs can be prepared by means of new link information every time link information is recorded.

According to a twenty-first aspect of the present invention, when new data are written over the existing recording packet, the link to the recording packet on which the new data are written is deleted from the existing link data. Under this data recording method, when new data are written over the existing recording packet, the link to the recording packet on which the new data are written is deleted from the existing link data, thereby preventing specification of new recording data from entering into the existing link data.

According to a twenty-second aspect of the present invention, a link count table for managing the number of linked recording packets is also recorded on the recording medium. With the foregoing configuration of the data recording method, vacant recording packets can also be managed simultaneous with managing of the linked recording packets. Accordingly, additional recording of data on vacant recording packets can be carried out smoothly.

According to a twenty-third aspect of the present invention, there is provided a recording medium having principal data recorded thereon and storing:

an original file which is prepared at the time of recording of the primary data and stores link data which are formed by arranging in sequence address data for reproduction purposes stored in a recording region on a recording medium; and a virtual file which is prepared through editing of the original file and stores link data formed by arranging in sequence address data for reproduction purposes stored in the recording region on the recording medium.

Data are reproduced according to the original file or the virtual file stored in the recording medium, thereby enabling reproduction of data in various modes, such as a full-reproduction mode or a digest reproduction mode. Further, the data are managed in the form of files, and hence the recording region on the recording medium can be effectively utilized.

According to a twenty-fourth aspect of the present invention, there is provided a recording medium having primary data recorded thereon and storing:

a file which is prepared the time of recording of the primary data and stores, in the form of a logical address, link data formed by arranging in sequence address data for reproduction purposes stored in a recording region on a recording medium. Preparation of a new file by editing the file enables editing or reproduction of the primary data; for example, preparation of a digest of the primary data. Data can be reproduced in various modes, such as a full-reproduction mode or a digest reproduction mode. Further, the data are managed in the form of files, and hence the recording region on the recording medium can be effectively utilized.

According to a twenty-fifth aspect of the present invention, the recording medium stores a new file which is prepared through editing an existing file and stores, in the form of a logical address, link data formed by arranging in sequence address data for reproduction purposes stored in the recording region on the recording medium. Data are reproduced according to the original file or the virtual file stored in the recording medium, thereby enabling reproduction of data in various modes, such as a full-reproduction mode or a digest reproduction mode.

According to a twenty-sixth aspect of the present invention, the recording medium has stored thereon data pertaining to a title set file for storing the address data pertaining to the files, and data pertaining to a link count table for managing the number of times files refers to each of unit recording regions into which the recording region on the recording medium is divided. Reserving of the link count table enables management of the respective unit recording regions. For example, the unit recording region assigned reference number 0 can be released as a recordable region, and the link data pertaining to the respective files can be accessed immediately.

According to a twenty-seventh aspect of the present invention, there is provided a recording medium having principal data discretely recorded thereon, wherein there are provided a plurality of types of link data sets for use in linking together respective discretely-recorded recording packets. By means of the link data sets, the user can enjoy various types of reproduction of data; for example, reproduction of data in a full-reproduction mode, a short-time mode, and a digest mode, by designation of desired link data.

According to a twenty-eighth aspect of the present invention, the recording medium is provided with data pertaining to a title set file for specifying a start address of each of the link data sets. By means of the title set file for specifying a start address of each of the link data sets, respectively link data sets can be immediately accessed.

BEST MODE FOR WORKING THE PRESENT INVENTION

Figure 1:
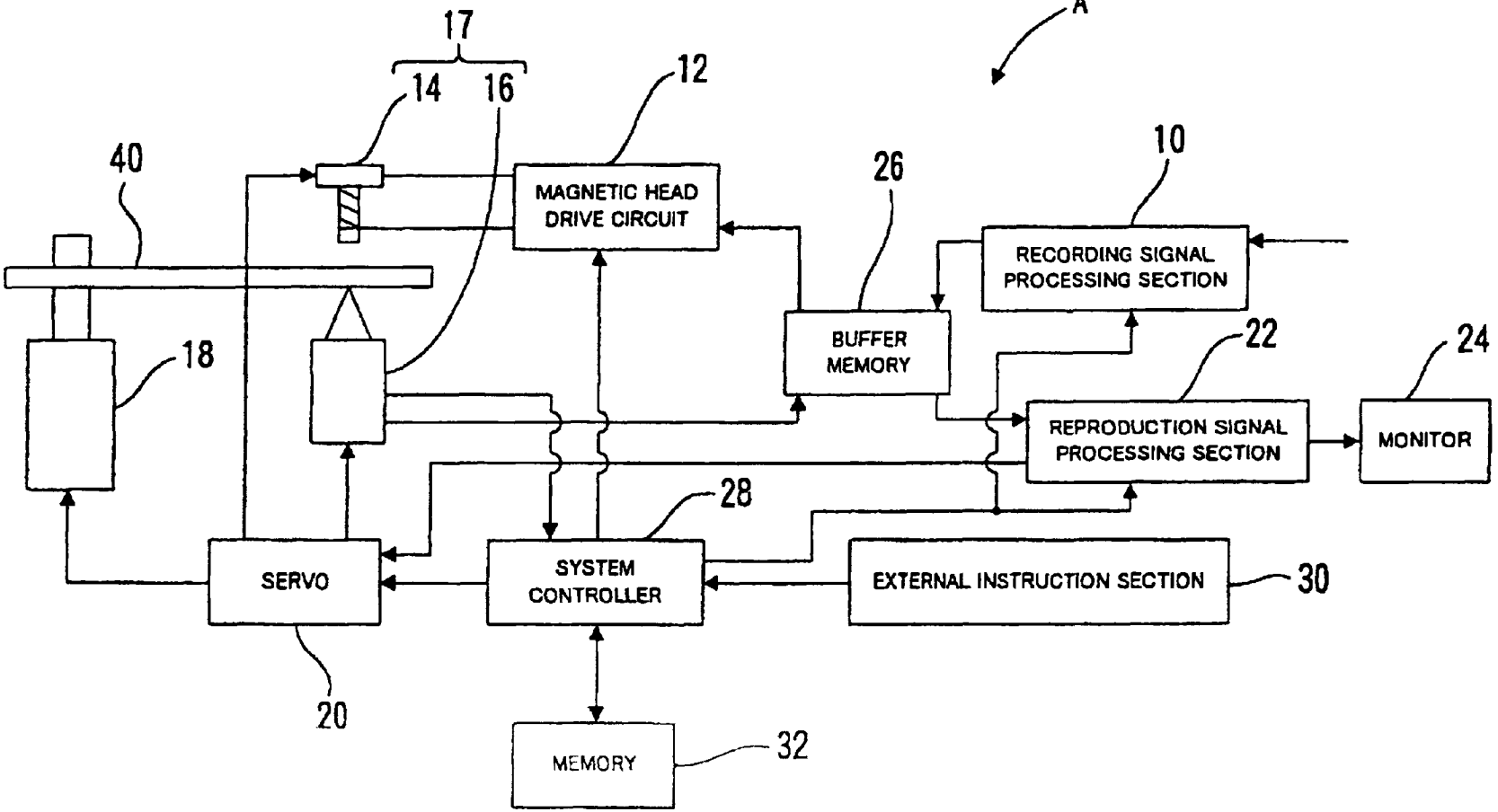
FIG. 1 is a block diagram showing a data recording/reproduction/editing system according to the present invention.

As shown in FIG. 1, a data recording/reproduction/editing system A serving as a data recording system according to the present invention comprises a recording signal processing section 10, a magnetic head drive circuit 12, a magnetic head 14, an optical (pickup) head 16, a spindle motor 18, a servo 20, a reproduction signal processing section 22, a monitor 24, buffer memory 26, a system controller 28, an external instruction section 30, and memory 32.

The data recording/reproduction/editing system A records audio-visual (AV) data serving as primary data on an optical magnetic disk 40 (hereinafter referred to simply as a "disk") serving as a recording medium. The data recording/reproduction/editing system A can reproduce AV data recorded on the magnetic disk 40 and also edit the AV data.

The digital recording processing section 10 subjects AV data input from the outside to an encoding operation, addition of an error correction code, and a digital modulation operation. The magnetic head drive circuit 12 drives the magnetic head 14 according to a signal sent from the recording signal processing section 10 by way of the buffer memory 26. The magnetic head 14 magnetizes a recording film placed on the disk 40 and is used for recording AV data on the recording film. The optical head 16 has a semiconductor laser. At the time of recording, a laser beam is emitted from the semiconductor laser. At the time of reproduction, a laser beam is radiated onto the disk 40, and light reflected from the disk 40 is received by the optical head 16. A head 17 is constituted by the magnetic head 14 and the optical head 16.

The spindle motor 18 rotatively drives the disk 40 at a predetermined rotational speed, and the servo 20 controls the number of rotations of the spindle motor 18 and effects servo control operations such as a focusing servo operation, a tracking servo operation, a spindle servo operation, and a thread servo operation. The reproduction signal processing section 22 subjects the signal read from the buffer memory 26 to digital demodulation, error correction, or decoding. The monitor 24 outputs, in the form of an image or sound, the signal processed by the reproduction signal processing section 22.

The buffer memory 26 records the AV data onto the disk 40 and temporarily stores AV data when the AV data are reproduced from the disk 40. The system controller 28 controls the overall data recording/reproduction/editing system; i.e., operation of individual sections of the data recording/reproduction/editing system A. The external instruction section 30 is used when the user performs various operations.

Figure 2:
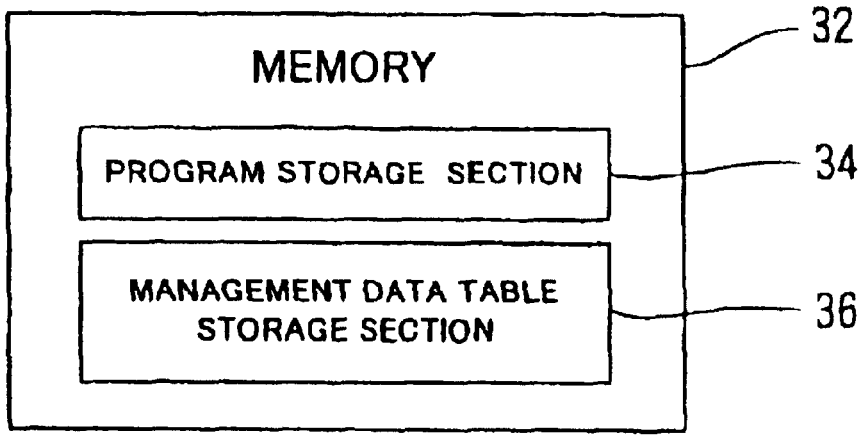
FIG. 2 is a block diagram showing memory used in the data recording/reproduction/editing system.

As shown in FIG. 2, the memory 32 has a program storage section 34 and a management data table storage section 36. The program storage section 34 stores an application program which governs the operation of the data recording/reproduction/editing system A. More specifically, the program storage section 34 stores a program for executing operations pertaining to a flowchart shown in FIGS. 6 through 11. The management data table storage section 36 stores a management data table to be described later.

The magnetic head drive section 12, the head 17, and the servo 20 act as a recording section, and the system controller 28 acts as a control section.

A data format of the disk 40 will now be described.

Figure 4:
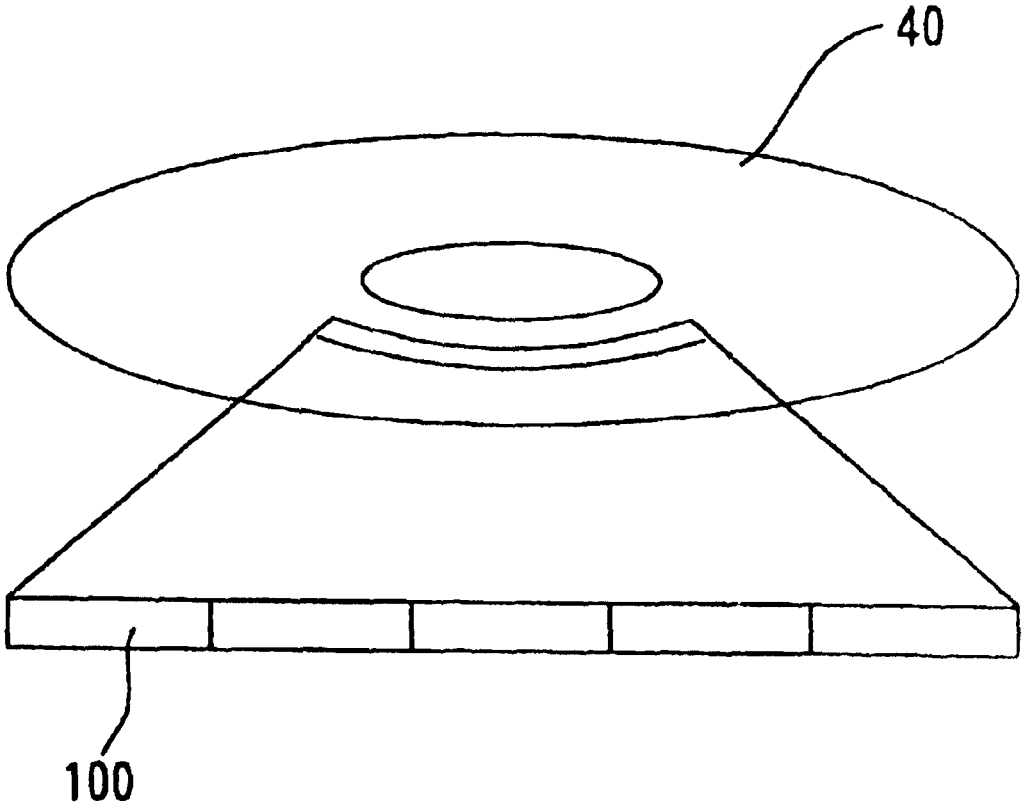
FIG. 4 is a conceptual view showing a data format of a disk.

As shown in FIG. 4, main storage of the disk 40 is divided into blocks; that is, N containers 100 (where N is a natural number). Each container 100 constitutes a data block comprising a predetermined number of bits. Preferably, the number of bits corresponds to the amount of data whose recording and reproduction requires a few seconds. The container 100 corresponds to a unit recording region. In the data recording/reproduction/editing system, AV data are subjected to editing, such as recording of the AV data on the disk 40 or reproduction of the AV data from the disk 40, on a per-container basis. A management region used for recording the management data table is ensured along the innermost periphery of the disk 40.

The structure of data provided in the management data table will now be described.

Figure 3:
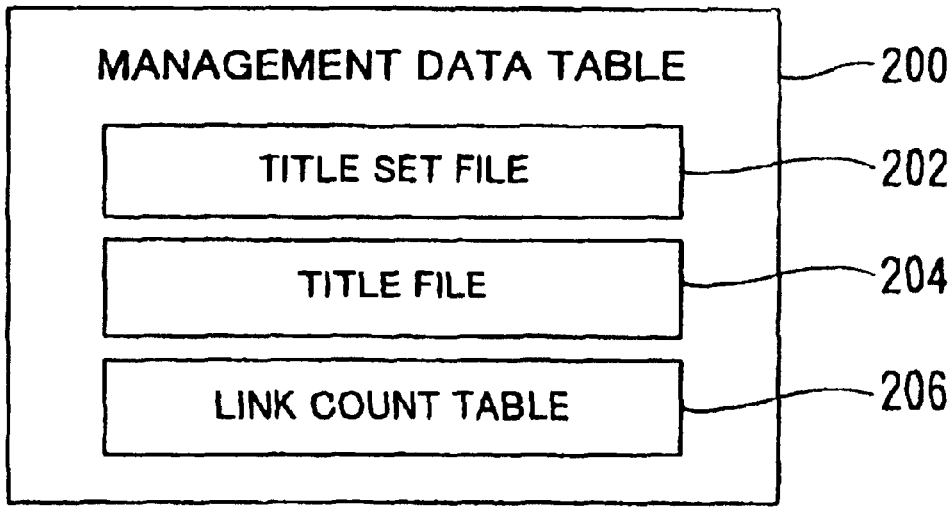
FIG. 3 is a block diagram showing the configuration of a management data table.

As shown in FIG. 3, the management data table 200 comprises a title set file 202, a title file 204, and a link count table 206.

Figure 5:
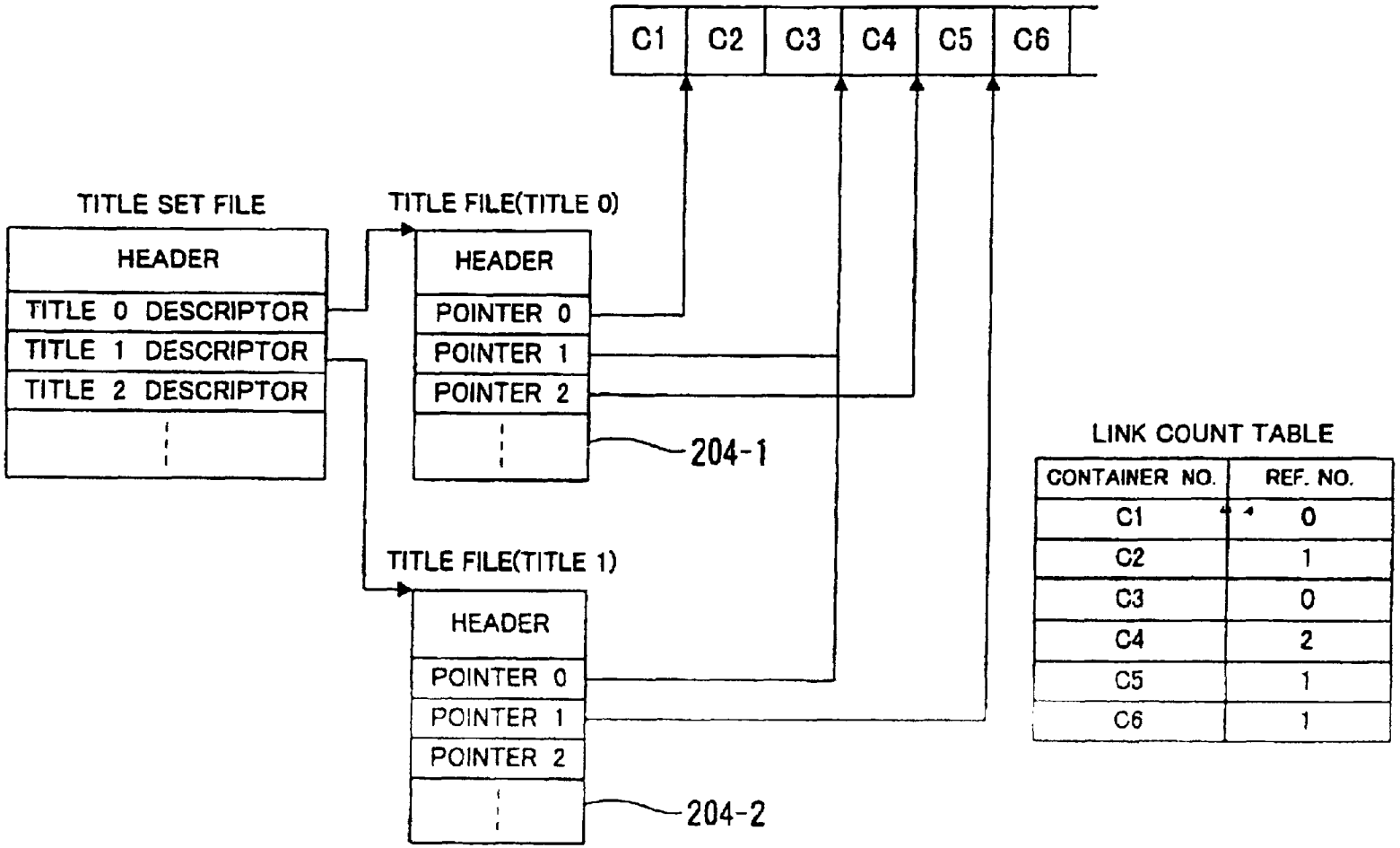
FIG. 5 is a descriptive view specifically showing the configuration of the management data table.

The title set file 202 manages a title file and comprises header information and start addresses of respective title files. For example, a title set file which is shown in FIG. 5 and entitled "Title 0 Descriptor" stores a start address of a title file 204-1. FIG. 5 is a diagram conceptually showing a specific example of the management data table.

The title file 204 stores link data pertaining to the title file. More specifically, as shown in FIG. 5, the title file 204 sequentially stores header data and address data pertaining to starting positions of respective containers on the disk 40 (hereinafter referred to simply as "container address data"). For instance, address data pertaining to the head sector of a container are stored in the title file 204. The address data are defined as a logic address. The address data are used for reproducing AV data and the address data pertaining to the respective containers are arranged in sequence of reproduction. In short, data pertaining to a sequence (or link) in which AV data are stored in the container 100 are reproduced. The title file corresponds to a term "file" used in the disclosure of the invention and claims appended hereto.

For example, in the title file 204-1, container numbers are specified in sequence of C2→C4→C5, to thereby specify sequence of reproduction. In the title file 204-1 shown in FIG. 5, "pointer 0" designates address data pertaining to container C4. In this way, the corresponding linked containers are specified for each title file, with the result that one AV program is composed for each title file. The header data comprise data pertaining to a title and data pertaining as to whether the file is an original file or a virtual file. The original file and the virtual file will be described later. A plurality of title files can be retained for a single title set file 202.

The containers managed under the title file may involve an overlap within a single title file or an overlap between title files. For example, as shown in FIG. 5, container C4 is referred to by the title file 204-1 of title 0 and a title file 204-2 of title 1. This case corresponds to a container which involves overlap between container between the title files. Alternatively, after a certain container has been specified by a certain title file, the container may be specified again.

The title file may be divided into an original file and a virtual file. The original file is produced or prepared when AV data are recorded. In contrast, a virtual file is prepared or produced after recorded AV data have been subjected to edition processing to be described later.

The link count table 206 shows the number of times title files refer to an individual container (hereinafter referred to simply as a "reference number"). If the reference number of a certain container is 0, the container can be recorded. In FIG. 5, no title file refers to container C1 as well as to C3. The reference number of a container assumes a value of 0 when no AV data have been recorded in a container at any time or when the user has deleted recorded data from a container. The operation of deletion will be described later. In a case where the reference number of a certain container has a value of one or more, the container is referred to by at least any one of the title files and constitutes a program. Therefore, such a container cannot be recorded. In FIG. 5, for example, two title files refer to container C4, and hence the reference number of container C4 is 2.

As mentioned above, the management data table manages the sequence of reproduction of containers and enables reproduction of the images and/or sounds desired by the user.

When a disk having the management data table recorded thereon is loaded to the data recording/reproduction/editing system A, the management data table is read first and stored in the memory 32.

Next, the operation of the data recording/reproduction/editing system A will be described.

Figure 6:
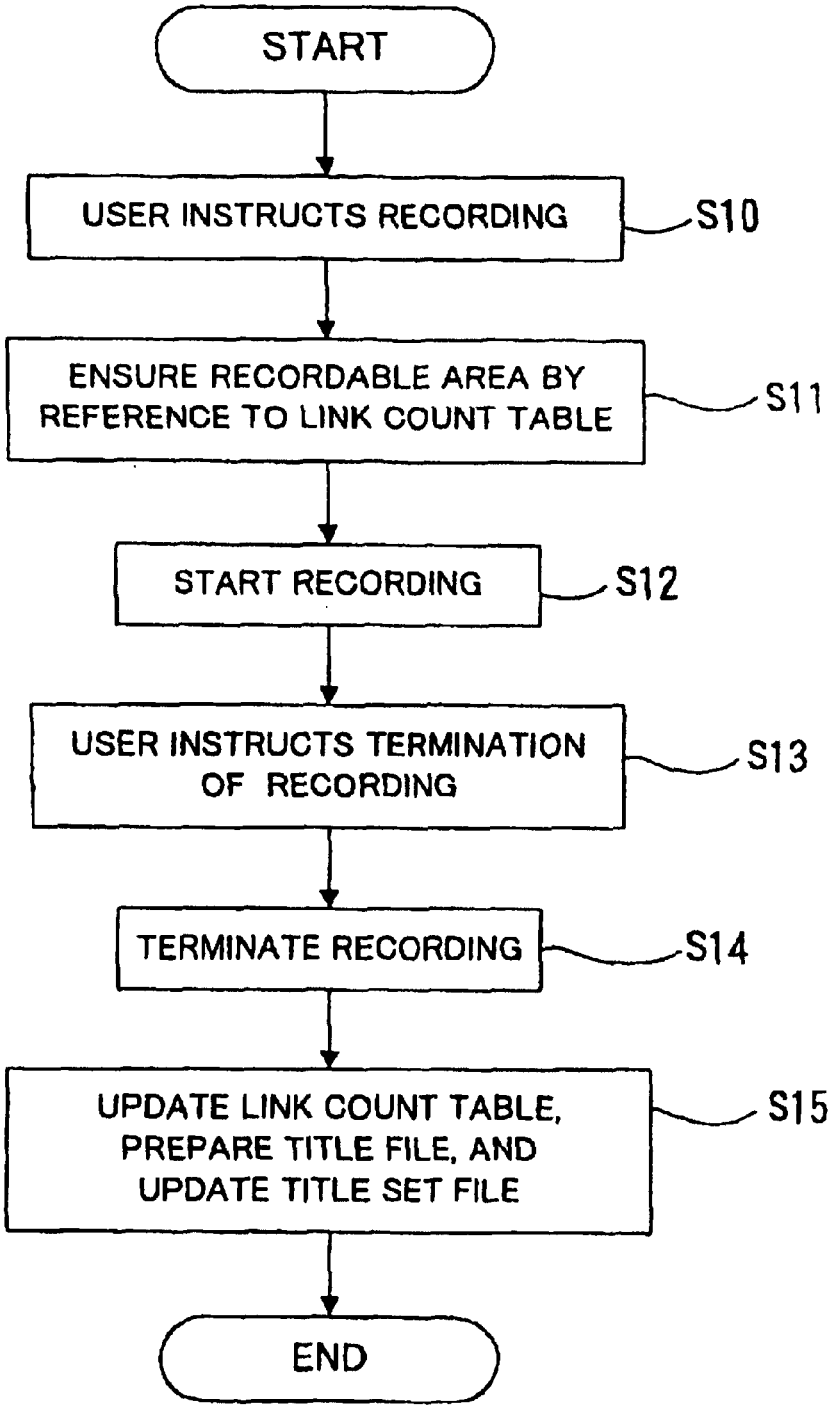
FIG. 6 is a flowchart showing the recording operation of the data recording/reproduction/editing system.

First, by reference to FIG. 6 and like drawings, an explanation is given of recording of AV data to the disk 40. Although various types of AV data are conceivable as AV data to be recorded, AV data pertaining to a broadcast, for example, are employed.

The user instructs recording by way of the external instruction section 30 (S10), and the system controller 28 refers to the link counter table 206 stored in the memory 32 and ensures a recordable region (S11). In other words, the system controller 28 finds a container to which no title file refers. When the disk is loaded into the data recording/reproduction/editing system A, data pertaining to the management data table stored in the disk 40 are read and stored into the memory 32. In the case of a virgin disk having no data recorded thereon, since a management data table is not recorded, data can be sequentially recorded on the disk from the first container. If the loaded disk 40 is a virgin disk and data pertaining to a management data table are not read from the disk 40, a link count table in which all the reference numbers of containers have a value of 0 is retained in the memory 32. Simultaneously, a title set file having no data recorded therein is retained in the memory 32. AV data are then sequentially recorded on recordable containers (S12).

At the time of recording of data, the following recording operations are performed. In the recording signal processing section 10, AV data input from the outside are subjected to an encoding operation, addition of an error correction code, and a digital modulation operation. The thus-processed AV data are written in the buffer memory 26. The buffer memory 26 performs a buffering operation so that the AV data can be recorded on the disk 40 on a per-container basis. More specifically, an AV data transfer rate (corresponding to a rate at which AV data are written into the buffer memory 26) is set so as to be higher than a rate at which AV data are recorded on the disk 40 or a rate at which AV data are reproduced from the disk 40 (corresponding to a rate at which AV data are reproduced from the buffer memory 26). The AV data are consecutively written into the buffer memory 26, whereas the AV data are intermittently read from the buffer memory 26. The thus-read AV data are input to the magnetic head drive circuit 12 and are recorded on the disk 40 on a per-container basis through use of the magnetic head 14 and the optical head 16.

In step S11, since the system controller 28 is retrieving a recordable container by reference to the link count table 206, the system controller 28 controls the servo 20 such that the AV data are recorded in a container to which no title file refers.

Next, the user instructs termination of recording (S13), and the recording operation is terminated (S14). The link count table is updated, a title file is generated, and the title set file is updated (S15).

In the link count table 206, the container on which AV data are newly recorded is assigned 1 as a reference number.

A new title file is generated, and header data pertaining to the title file are generated according to details (for example, a title) specified by the user by way of the external instruction section 30. Data pertaining to the start address of the container on which AV data are recorded are added to the header data as a sequential pointer. A specific symbol is embedded as a final pointer in a final container so that the container can be identified as the final container. The title file that has been subjected to such a recording process is taken as an original file. Preferably, data indicating that the title file is an original file are written into the header data pertaining to the title file. The process for generating, at the time of recording of principal data, such an original file corresponds to a "process for generating link data which comprise address data for reproduction purposes arranged in sequence in a recording area of a recording medium."

The start address of a new title file is stored in the title set file as a "title 'n' descriptor."

Figure 12:
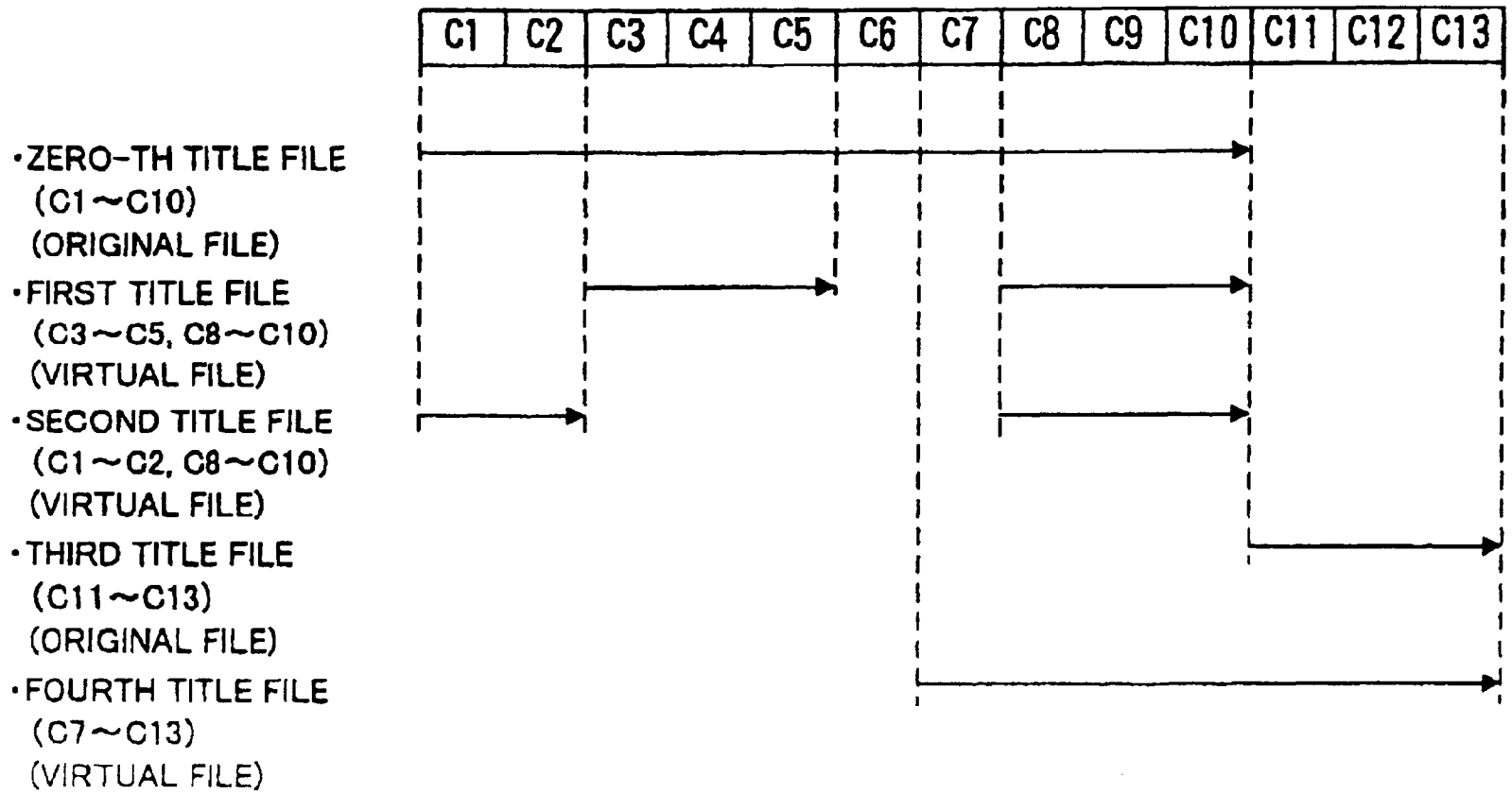
FIG. 12 is a descriptive view showing the configuration of respective title files for describing the operation of the data recording/reproduction/editing system.

For example, as shown in FIG. 12, when AV data are recorded on containers C1 to C10, all of which are assigned 0 as a reference number, containers C1 to C10 are written as link data into a title file to be newly produced (this title file is taken as a zero-th title file). The zero-th title file shown in FIG. 12 corresponds to an original file. At a point in time when only the zero-th title file is produced, containers C1 to C10 in the link count table are assigned 1 as a reference number.

If termination of recording is instructed at any point of a certain container, recording is continued to some extent even after instruction for termination of recording, because recording is effected on a per-container basis.

Data pertaining to the title file produced through recording, an updated title set file, and a updated link count table; that is, data pertaining to a management data table, are written into a management region along the innermost periphery of the disk according to an instruction for removal of the disk. The process for writing title file data corresponds to a "process for recording link data onto a recording medium." In the case of a virgin disk, a title set file and a link count table, as well as title file data, are newly written into the management region. Although a single title set file is sufficient for recording a management information table on a certain disk, a plurality of title set files may also be written on the disk.

If recording is terminated at any point of a certain container, the remaining area of the container must be padded, because data are recorded on a per-container basis in the present embodiment. The processing relating to step S15 may be performed not after recording of data but during the course of recording of data.

The operation of the data recording/reproduction/editing system A at the time of edition of AV data recorded on the disk 40 will now be described by reference to FIG. 7 and like drawings. The following editing operation can be employed in, for example, a case where a digest of AV data pertaining to a certain program is created.

By way of the external instruction section 30, the user selects one of the reserved title files (S20). For example, according to the management data table stored in the memory 32, a list of title files is displayed on the monitor 24, and the user selects an arbitrary title file from the list by way of the external instruction section 30. At the time of indication of the title file list, the system controller 28 reads data (e.g., a title) reserved in the header data pertaining to the title file from the memory 32 and displays the thus-read data on the monitor 24.

The user then specifies an editing start point (S21). Specifically, it is contemplated that while AV data are reproduced according to the link data pertaining to a selected title file, the user performs specifying action at a desired editing start point by way of the external instruction 30. Next, the user specifies an editing end point (S22). Specifically, it is contemplated that while AV data are reproduced according to the link data pertaining to the selected title tile, the user performs specifying action at a desired editing end point. Alternatively, an editing start point and an editing end point may be determined on the basis of a time that is to lapse from the start of a recording area or on the basis of the amount of data from the start of a recording area. If the user specifies an editing start point or an editing end point at halfway position in a certain container, containers corresponding to the thus-specified editing start and end points may be included as containers to be subjected to editing. Alternatively, at an editing start time, a container after the container corresponding to the editing start time may be subjected to editing, and a container before the container corresponding to the editing end time may be subjected to editing.

The user determines whether to edit another portion with regard to the same title file (S23). If another portion is edited with regard to the same title file, processing returns to step S21. In contrast, if the user does not edit any other portion with regard to the same title file, the user determines whether to edit another title file (S24). If the user edits another title file, processing returns to step S20, where the user can edit a plurality of title files, as well as a plurality of containers with regard to the same title file. If the user does not edit any other tile file in step S24, the link count table is updated, a title file is generated, and the title set file is updated (S25).

In the link count table, the reference number of each of the containers to which the title file has newly referred is incremented by one. If a new title file refers to a certain container a plurality of times, the reference number of the container is incremented by an amount corresponding to the number of times the container has been referred to.

A new title file is generated in the memory 32, and header data pertaining to the title file are produced according to details (for example, a title) specified by the user by way of the external instruction section 30. The address data pertaining to the container that has been edited is added to the header data as a sequential pointer. The address data pertaining to the container may be selected from the data reserved in the title file selected in step S20. More specifically, the address data pertaining to the container are formed from at least a portion of a series of address data sets reserved in the title file which is used as a source for editing. A special symbol is embedded as a final pointer in a final container so that the container can be identified as the final container.

The start address of a new title file is stored in the title set file as a "title 'n' descriptor."

Figure 7:
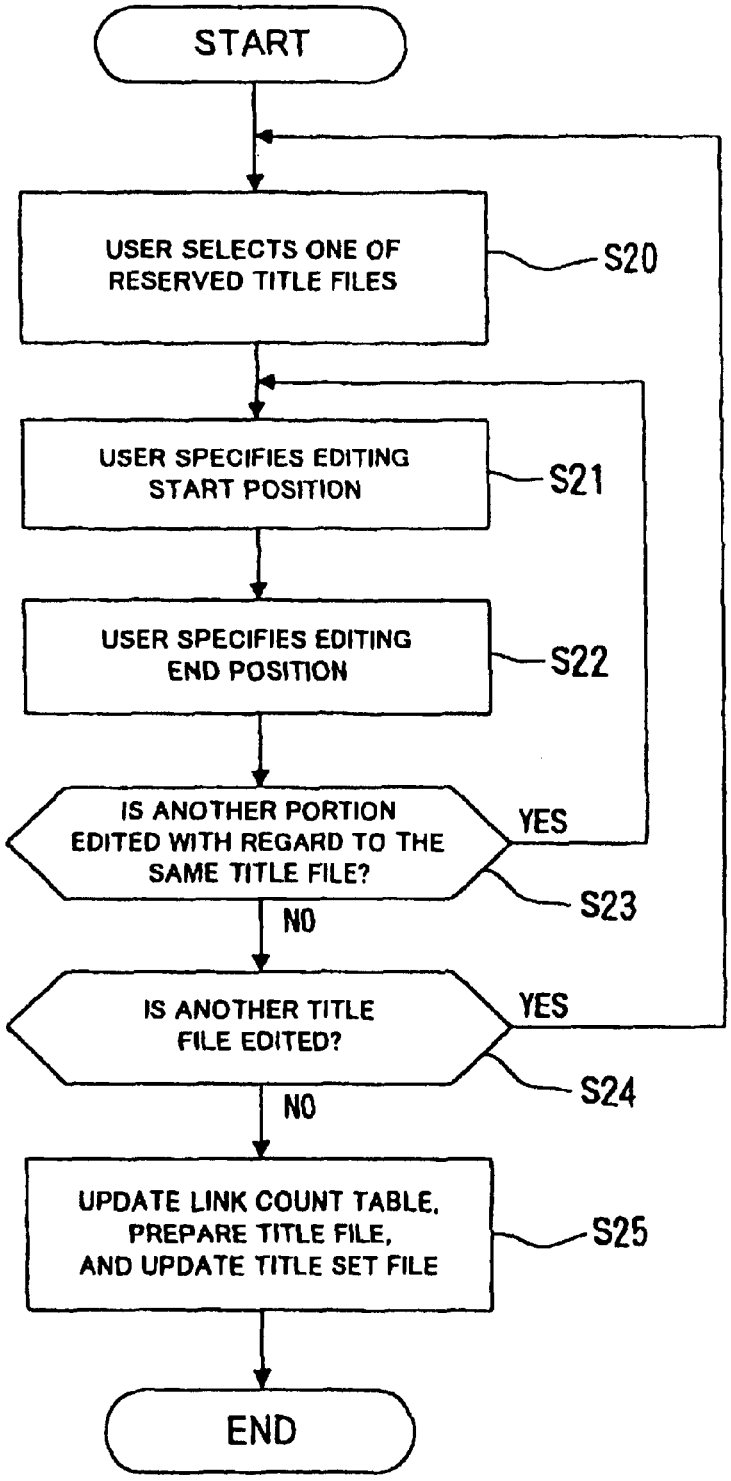
FIG. 7 is a flowchart showing the editing operation of the data recording/reproduction/editing system.
Figure 8:
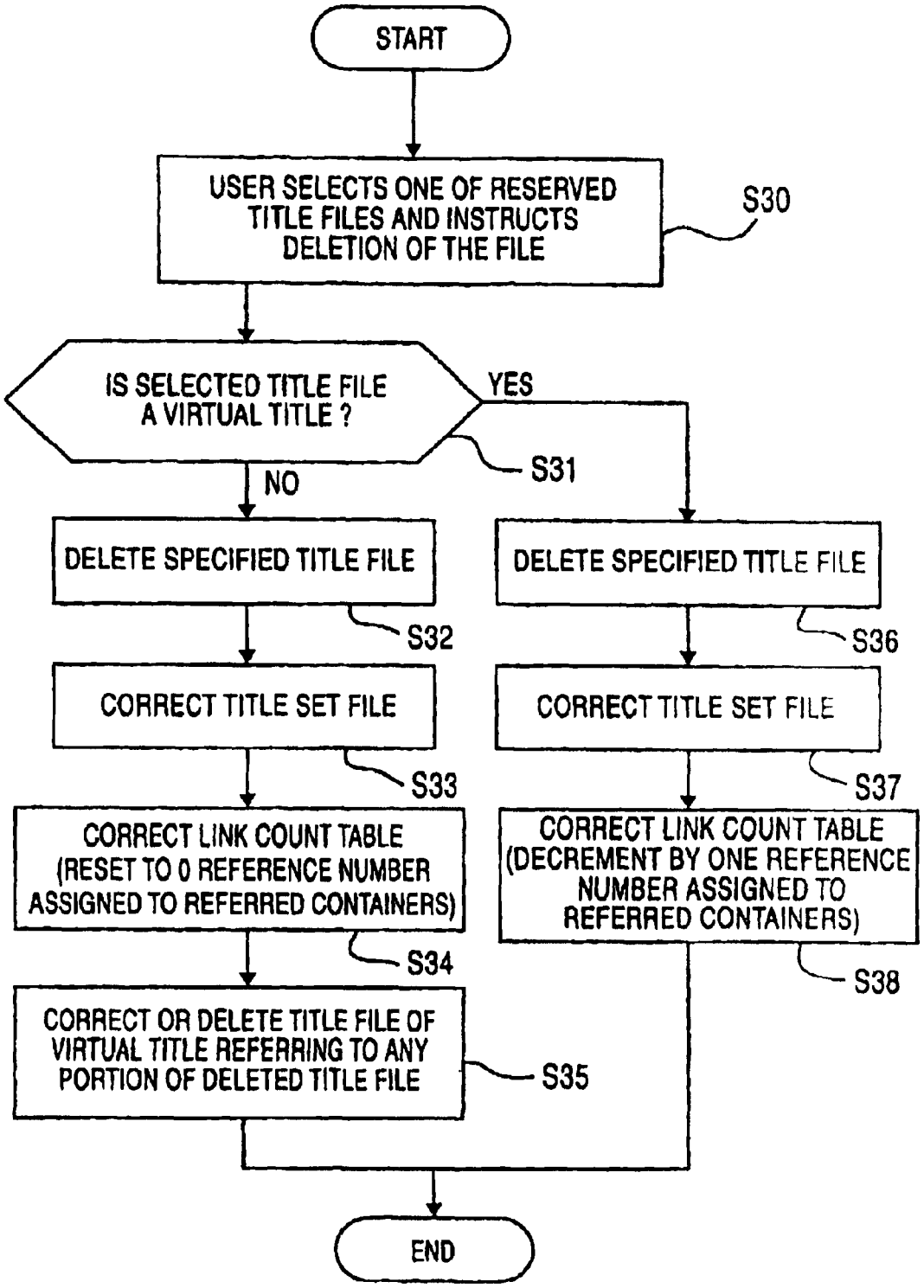
FIG. 8 is a flowchart showing the operation of the data recording/reproduction/editing system when a title is wholly deleted according to a first deleting method.

Processing pertaining to a flowchart shown in FIG. 7 is essentially controlled by the system controller 28 according to a program reserved in the memory 32.

For example, in an example shown in FIG. 12, a first title file is produced through the following processing operation. Specifically, the zero-th title file is selected, and starting of editing is instructed at the position of container C3 (S21). Termination of editing is instructed at the position of container C5 (S22). In order to edit containers C8 to C10, processing again returns to step S21 from step S23, thus specifying containers C8 to C10. Since no other title file is edited in step S24, processing proceeds to step S25. At a point in time when the zero-th title file and the first title file are produced, the reference number assigned to containers C3 to C5 and C8 to C10 in the link count table is 2.

In the example shown in FIG. 12, the second title file is produced through the following processing. First, the zero-th title file is selected (S20), and containers C1 and C2 are specified (S21 and S22). In order to edit the first title file, processing returns to step S20 from steps S23 and S24. The first title file is then selected. Subsequently, containers C8 to C10 are specified (S21 and S22), and processing proceeds to steps S23, S24, and S25. At a point in time when the zero-th title file, the first title tile, and the second title file are produced, the reference number assigned to each of containers C1 to C5 in the link count table becomes 2. The reference number assigned to each of containers C8 to C10 becomes 3. Although in the foregoing description at the time of editing of containers C8 to C10 in the second title file the first title file is edited first, the zero-th title file may be edited first.

The first and second title files shown in FIG. 12 are virtual files. Preferably, data indicating that title files are virtual files are written in header data pertaining to the respective title files. The process for generating such virtual files corresponds to a "process for generating link data which differ from existing link data and comprise reproduction address data sets arranged in sequence in a recording area of a recording medium, by editing of existing link data."

Updating of the link count table in step S25 or updating of a title set file in step S25 may be sequentially performed during editing. In the present embodiment, AV data are edited on a per-container basis.

As shown in FIG. 12, in the zero-th title file serving as the original file, address data are sequentially linked to continuous containers. Even in the original file, naturally there is a case where containers to be linked according to address data are discretely recorded on the disk. FIG. 12 can be said to show a plurality of types of link data for linking discretely-recorded packets together.

In contrast with the foregoing case, if the original sequence of reproduction may be discarded at the time of editing of AV data, address data pertaining to the title file may be updated in a newly-edited sequence of reproduction. In other words, the existing title file is replaced with a title file having new link data. If reproduction of some containers becomes unnecessary as a result of changing of the sequence of reproduction to a new sequence of reproduction, the reference number assigned to those containers in the link count table is decremented. Through the foregoing operations, virtual edition of AV data is carried out.

Data pertaining to the title file produced through the foregoing editing operations and data pertaining to the updated title set file and the updated link count table are written into the management region along the innermost periphery of the disk according to an instruction for removal of the disk. The processing for writing data onto the title file corresponds to a "process for recording link data on a recording medium." In a disk which has been found not to have a title set file or a link count table recorded thereon at the time of being loaded into the data recording/reproduction/editing system A, a tile set file and a link count table are also newly written into the management region.

The operation of the data recording/reproduction/editing system A when the AV data recorded on the disk 40 are reproduced will now be described.

First, the user selects one title file to be reproduced from among the reserved title files, by way of the external instruction section 30. For example, according to the management data table reserved in the memory 32, a list of title files are displayed on the monitor 24, and the user selects an arbitrary title file by way of the external instruction section 30.

Data indicating which of the title files is selected are sent from the external instruction section 30 to the system controller 28, and the system controller 28 controls the servo 20 so as to access a predetermined container on the basis of the address data pertaining to a container stored in the selected title file. The servo 20 controls the optical head 16 and the spindle motor 18. The optical head 16 emits a laser beam and receives light reflected from the recording surface of the disk 40, to thereby read the AV data recorded on the disk 40. For example, in the example shown in FIG. 12, in a case where the first title file is selected, AV data are read out from containers in the sequence of C3, C4, C5, C8, C9, and C10. If an instruction for specifying a title file to be reproduced is not entered by way of the external instruction section 30, a title file located at the head of the title set file is reproduced. For example, in the case shown in FIG. 5, according to the address data reserved in the title file 204-1 of title 0, containers are accessed from the top in sequence of point 0, pointer 1, pointer 2, . . . .

The thus-read AV data are temporarily stored in the buffer memory 26. At this time, the rate at which the AV data are written into the buffer memory 26 and the rate at which the AV data are read from the buffer memory 26 are switched in relation to the case at the time of recording. Specifically, the AV data are intermittently written into the buffer memory 26 at the rate at which the AV data are recorded on or reproduced from the disk 40 (corresponding to the rate at which the AV data are written into the buffer memory 26), and the AV data are read from the buffer memory 26 at a rate at which the AV data are transferred (corresponding to a rate at which the AV data are read from the buffer memory 26).

The AV data read from the buffer memory 26 are subjected to digital demodulation, error correction, and decoding in the reproduction signal processing section 22, and the thus-processed data are output by way of the monitor 24.

An explanation will now be given of deletion of a title file or erasure of a portion of a title file.

Two methods are conceivable for deleting a title file or a portion of a title file. According to a first deleting method, an original file is distinguished from a virtual file. The virtual file is handled as being of a lower hierarchical level than the original file. When the original file is deleted, a portion of the virtual file which is referred to is also deleted. According to a second deleting method, an original file and a virtual file are handled as being of the same hierarchical level. Even if the original file is deleted, a portion of the virtual file which is referred to is not deleted.

The first deleting method will now be described. Deletion of a title file on a per-title basis will first be described by reference to FIG. 8 and like drawings.

The user selects one of the reserved title files and instructs deletion of the thus-selected title file by way of the external instruction section 30 (S30). For example, according to the management data table reserved in the memory 32, a list of title files is displayed on the monitor 24. By way of the external instruction section 30, the user selects an arbitrary title file and instructs deletion of the thus-selected title file. At the time of indication of the list of title files, the system controller 28 reads from the memory 32 data (e.g., a title) reserved in the header data pertaining to the title file and displays the thus-read data on the monitor 24.

A determination is then made as to whether or not the selected title file is an original file or a virtual file (S31). Since the data indicating whether the title file is an original file or a virtual file are stored in the header data pertaining to the title file, the system controller 28 can make a determination on the basis of the data. If the title file is determined to be an original file, processing proceeds to step S32. In contrast, if the title file is determined to a virtual file, processing proceeds to step S36.

In step S32, the specified title file is deleted from the memory 32.

Subsequently, the title set file 202 is corrected (S33). Specifically, data pertaining to a title file to be deleted are deleted.

Further the link count table 206 is corrected (S34). The reference number assigned to the containers to which the deleted title file has referred is reset to 0, and these containers are opened as recordable areas.

The title file of a virtual file which refers to any portion of the deleted title file is corrected or deleted (S35). If a certain title file refers to only a container referred to by the title file to be deleted, the title file is deleted. Alternatively, if a certain title file refers to a container to which the title file to be deleted refers and to another container, the contents of the title file are corrected.

In contrast, if in step S31 the title file is determined to be a virtual file, processing proceeds to step S36, and the specified title file is deleted from the memory 32.

Next, the title set file 202 is corrected (S37). Data pertaining to the title file to be deleted are deleted.

The link count table 206 is corrected (S38). The reference number assigned to the containers referred to by the deleted title file is decremented by one. If the deleted title file refers to a certain container a plurality of times, the reference number assigned to the container is decremented by an amount corresponding to the number of times the container is referred to. In this regard, the same applies to processing pertaining to step S53 to be described later.

Figure 13:
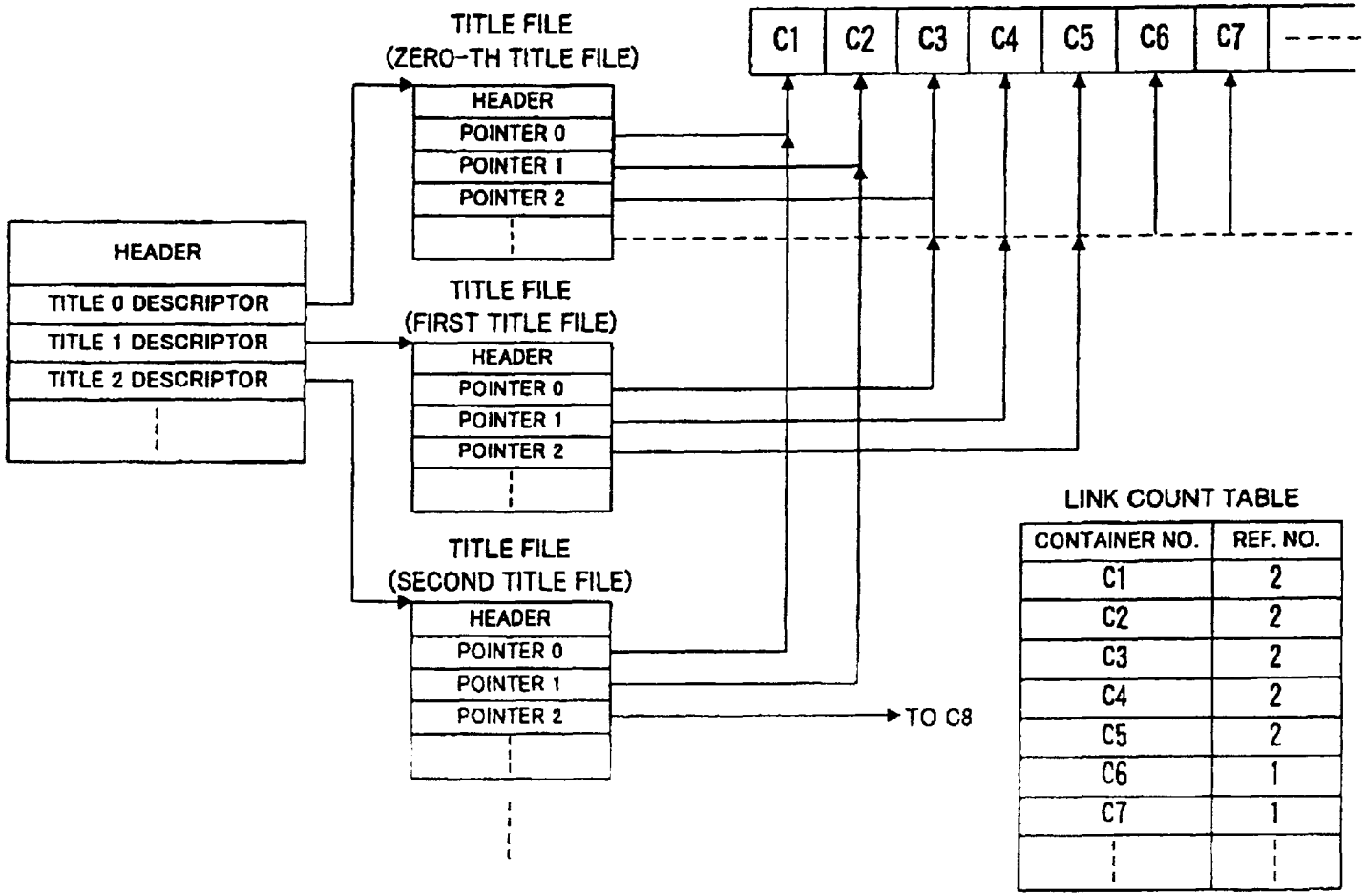
FIG. 13 is a descriptive view showing the configuration of a management data table used in conjunction with the configuration of title file shown in FIG. 12.

Specific processing will be described by reference to the example shown in FIG. 12. In FIG. 12, a third title file is an original file which refers to containers C11 to C13. Further, a fourth title file is a virtual file which refers to containers C7 to C13. Containers C7 to C13 correspond to containers obtained through editing of the zero-th title file, and containers C8 to C13 correspond to containers obtained through editing of the third title file. FIG. 13 shows correspondence among the link count table, the title set files, and the title files shown in FIG. 12. The link count table shown in FIG. 13 shows a case where AV data are stored in the zero-th title file to the second title files.

In a case where the zero-th title file is deleted, since the zero-th title file is an original file, processing proceeds to step S32, where the zero-th title file is deleted from the memory 32 (S32). The data pertaining to the zero-th title file are deleted from the title set file 202 (S33). In the link reference table, the count number assigned to containers C1 to C10 is reset to 0 (S34). Through processing pertaining to step S35, the first title file and the second title file are deleted from the memory 32. From the fourth title file, address data pertaining to containers C7 to C10 are deleted, and address data pertaining to containers C11 to C13 are stored into the fourth title file. The third title file is left, exactly as is.

In a case where the first title file is deleted, sine the first title file is a virtual file, processing proceeds to step S36, where the first title file is deleted from the memory 32. Data pertaining to the first title file are deleted from the title set file 202 (S37). In the link count table, the reference number assigned to each of containers C3 to C15 and C8 to C10 is decremented by one (S38).

When the third title file is deleted, the link data pertaining to the fourth title file are corrected to containers C7 to C10.

Figure 9:
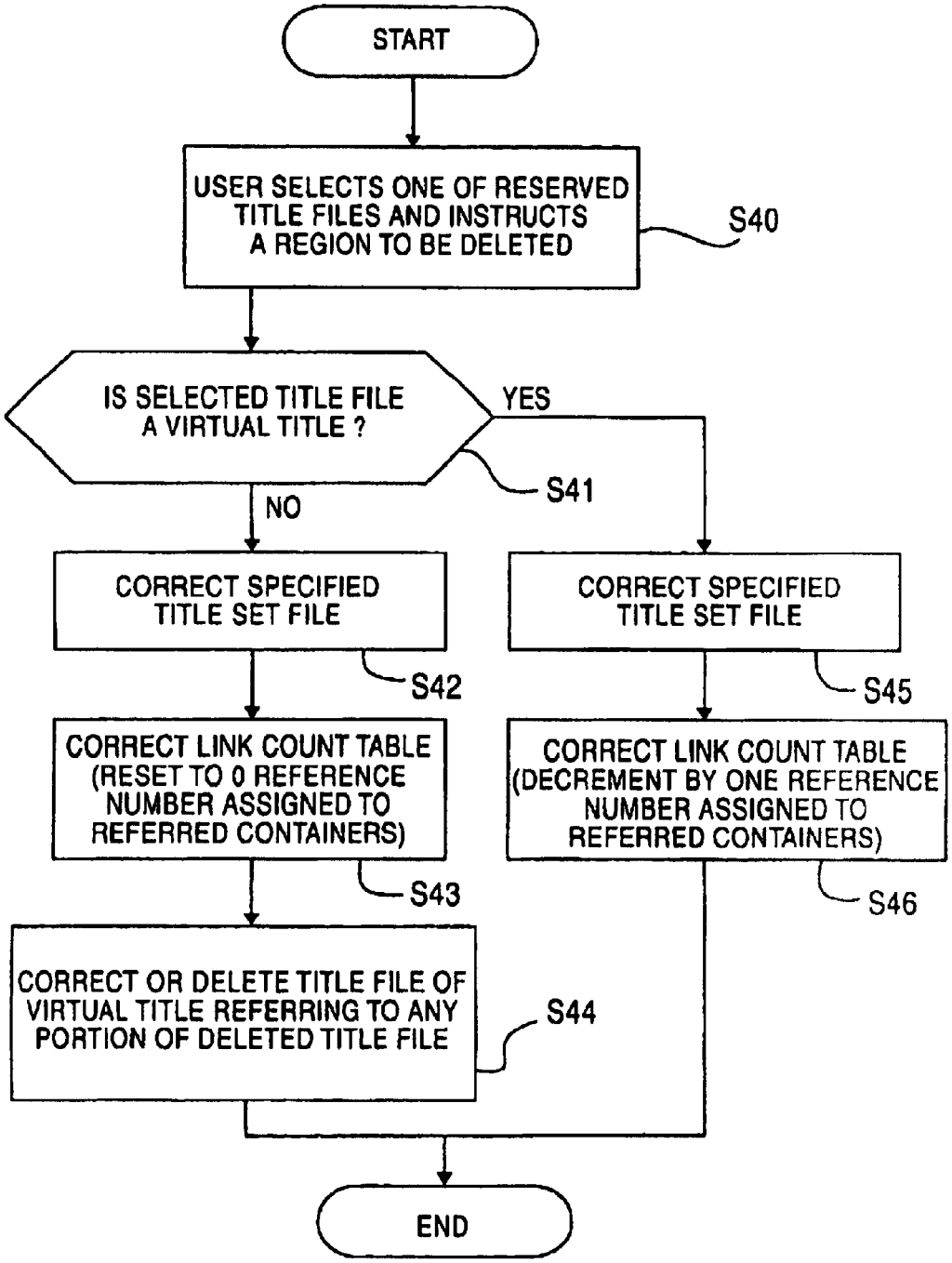
FIG. 9 is a flowchart showing the operation of the data recording/reproduction/editing system when a portion of a title is deleted according to the first deleting method.
Figure 10:
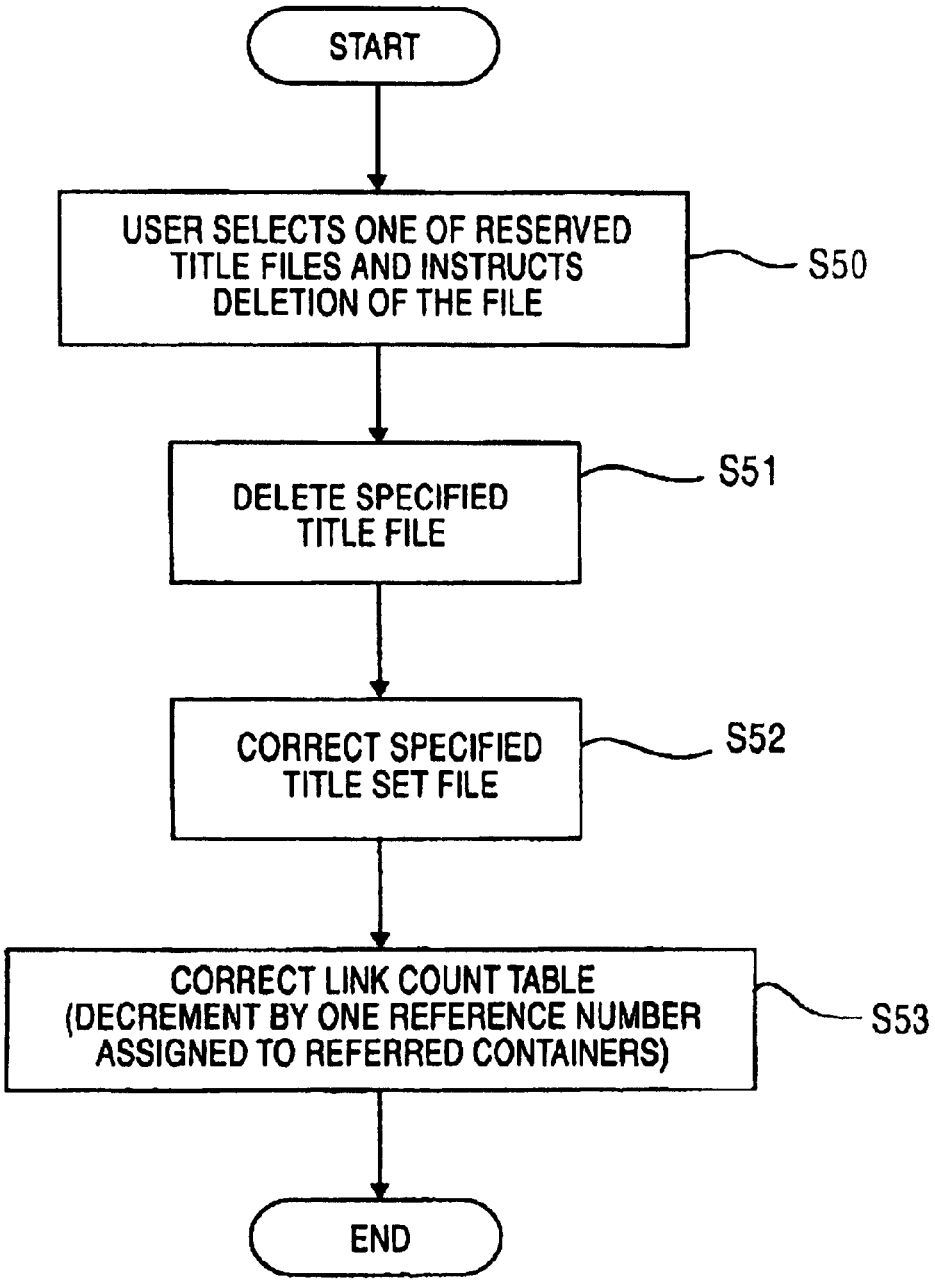
FIG. 10 is a flowchart showing the operation of the data recording/reproduction/editing system when a title is wholly deleted according to a second deleting method.

Deletion of a portion of the title file according to the first deleting method will now be described by reference to FIG. 9 and like drawings. In this case, not the entirety of a certain title file is deleted, but a portion of a title file is deleted. In this case, there is performed processing substantially identical with that employed for deleting a title file on a per-file basis. The difference between deletion of a title file and deletion of a portion of a title file resides in that deletion of a portion of a title file does not involve an amendment of the title set file.

First, the user selects one of the reserved title files and instructs deletion of the thus-selected title file by way of the external instruction section 30 (S40). For example, according to the management data table stored in the memory 32, a list of title files is displayed on the monitor 24, and the user selects an arbitrary title by way of the external instruction section 30 and specifies deletion start and end points. Conceivable measures for specifying the deletion start and end points include a method of specifying the deletion start and end points while AV data are reproduced, and a method of specifying a deletion start point and a deletion end point on the basis of a time that is to lapse from the start of a recording area or on the basis of the amount of data from the start of recording area. At the time of indication of the title file list, the system controller 28 reads from the memory 32 data (e.g., a title) reserved in the header data pertaining to the title file and displays the thus-read data on the monitor 24.

A determination is then made as to whether or not the selected title file is an original file or a virtual file (S41). Since the data indicating whether the title file is an original file or a virtual file are stored in the header data pertaining to the title file, the system controller 28 can make a determination on the basis of the data. If the title file is determined to be an original file, processing proceeds to step S42. In contrast, if the title file is determined to be a virtual file, processing proceeds to step S45.

In step S42, the specified title file is corrected. In other words, the address data pertaining to containers located in the region to be deleted are deleted.

Further, the link count table 206 is corrected (S43). The reference number assigned to the containers located in the region to be deleted is reset to 0, and these containers are released as recordable areas.

The title file of a virtual file which refers to any portion of the region to be deleted is corrected or deleted (S44). If a certain title file refers to only the containers located in the region to be deleted, the title file is deleted. Alternatively, if a certain title file refers to containers located in the region to be deleted and to another container, the contents of the title file are corrected.

In contrast, if in step S41 the title file is determined to be a virtual file, processing proceeds to step S45, and the specified title file is corrected. In other words, the address data pertaining to the containers located in the region to be deleted are deleted.

The link count table 206 is corrected (S46). The reference number assigned to the containers located in the region to be deleted is decremented by one. If a certain container located in the region to be deleted is referred to a plurality of times, the reference number assigned to the container is decremented by an amount corresponding to the number of times the container is referred to. In this regard, the same applies to processing pertaining to step S62 to be described later.

Specific processing will be described by reference to the example shown in FIG. 12.

In a case where containers C3 and C4 of the zero-th title are deleted, since the zero-th title is the original file, processing proceeds to step S42, where the zero-th title file is corrected (S42). Specifically, address data pertaining to containers C3 and C4 are deleted, and address data pertaining to container C5 comes to fall next to the address data pertaining to container C2. In the link count table, the count number assigned to containers C3 and C4 is =reset to 0 (S43). Through processing relating to step S44, address data pertaining to containers C2 and C3 are deleted from the first title file such that the address data pertaining to container C5 comes to fall at the beginning of the first title file. When containers C3 to C5 of the zero-th title file are deleted, the address data stored in the first title file are also completely deleted, in turn resulting in deletion of the first title file itself.

In the case of deletion of containers C3 and C4 of the first title file, since the title file is a virtual file, processing proceeds to step S45, where address data pertaining to containers C2 and C3 are deleted from the first title file such that the address data pertaining to container C5 comes to fall at the beginning of the first title file. In the link count table, the reference number assigned to containers C3 and C4 is decremented by one (S46).

The second deleting method will now be described. Deletion of a title file on a per-title basis will first be described by reference to FIG. 10 and like drawings.

The user selects one of the reserved title files and instructs deletion of the thus-selected title file by way of the external instruction section 30 (S50). Even in this case, as in the case of the processing relating to step C30 and C40, according to, for example, the management data table reserved in the memory 32, a list of title files is displayed on the monitor 24. By way of the external instruction section 30, the user selects an arbitrary title file and instructs deletion of the thus-selected title file. At the time of indication of the list of title files, the system controller 28 reads from the memory 32 data (e.g., a title) reserved in the header data pertaining to the title file and displays the thus-read data on the monitor 24.

The specified title file is deleted from the memory 32 (S51).

Next, the title set file 202 is corrected (S52); information about the title set file which is an object of deletion is deleted.

Subsequently, the title set file 202 is corrected (S53). Specifically, the reference number assigned to the containers referred to by the deleted title file is decremented by one. The containers whose reference number becomes 0 as a result of decrement of the reference number are released as recordable areas.

According to the second deleting method, since an original file and a virtual file are handled as being of the same hierarchical level, the original file is not distinguished from the virtual file.

Specific processing will be described by reference to the example shown in FIG. 12.

For example, when the zero-th title file is selected and deleted, the zero-th title file is deleted from memory 32 (S51). Data pertaining to the zero-th title file are deleted from the title set file 202 (S51). In the link count table, the reference number assigned to containers C1 to C10 is decremented by one (S53). As shown in FIG. 12, if the zero-th title file is deleted while the zero-th title file through the fourth title file are recorded in the disk, the reference number assigned to, for example, containers C1 to C5 is decremented from two to one; the reference number assigned to container C6 is decremented to zero; the reference number assigned to container C7 is decremented from two to one; and the reference number assigned to containers C8 to C10 is decremented from three to two.

Figure 11:
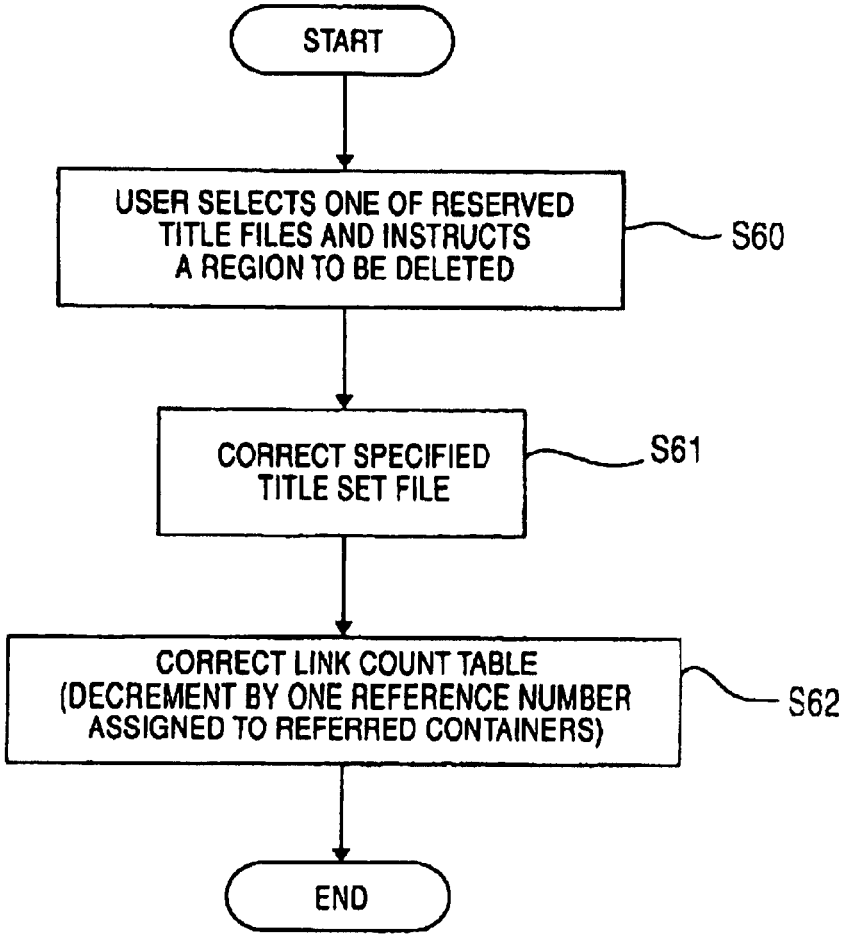
FIG. 11 is a flowchart showing the operation of the data recording/reproduction/editing system when a portion of a title is deleted according to the second deleting method.

Deletion of a portion of the title file according to the second deleting method will be described by reference to FIG. 11 and like drawing. In this case, not the entirety of a certain title file, but a portion of the title file is deleted.

Even in this case, processing substantially identical with that used for deleting the entire title file is performed. Since, the entirety of the title file is not intended to be deleted, the processing for deleting a portion of a title file differs from the processing for deleting the entirety of a title file in that a title set file is not corrected.

First, the user selects one of the reserved title files and instructs deletion of the thus-selected title file by way of the external instruction section 30 (S60). For example, according to the management data table stored in the memory 32, a list of title files is displayed on the monitor 24, and the user selects an arbitrary title by way of the external instruction section 30 and specifies deletion start and end points. Conceivable measures for specifying the deletion start and end points include a method for specifying the deletion start and end points while AV data are reproduced and a method of specifying a deletion start point and a deletion end point on the basis of a time that is to lapse from the start of a recording area or on the basis of the amount of data from the start of recording area.

The thus-specified title file is corrected (S61). Specifically, the address data pertaining to containers located in the region to be deleted are deleted.

Next, the link count table 206 is corrected (S62). Specifically, the reference number assigned to the containers referred to by the deleted title file is decremented by one. The containers whose reference number becomes 0 as a result of decrement of the reference number are released as recordable areas.

Specific processing will be described by reference to the example shown in FIG. 12.

In a case where containers C3 and C4 of the zero-th title are deleted, the zero-th title file is corrected (S61). Specifically, address data pertaining to containers C3 and C4 are deleted, and address data pertaining to container C5 comes to fall next to the address data pertaining to container C2. In the link count table, the reference number assigned to containers C3 and C4 is decremented by one (S62). In the example shown in FIG. 12, the reference number assigned to containers C3 and C4 is decremented from two to one.

The contents of the management data table modified through deletion of a title file are written into the management region along the innermost periphery of the disk according to an instruction for removal of the disk.

As a result of deletion of a title file, containers whose reference number has become zero can be recorded. As mentioned above, the data recording/reproduction/editing system A is provided with the link count table for managing the reference number of each title tile, to thereby enable management of vacant containers. Consequently, recording of AV data in vacant containers can be performed smoothly.

In contrast with the foregoing case, in a case where another data set is written over a container already having AV data recorded thereon by simultaneously performing deletion of the already existing AV data and writing of another data set, the following processing is performed.

Figure 14:
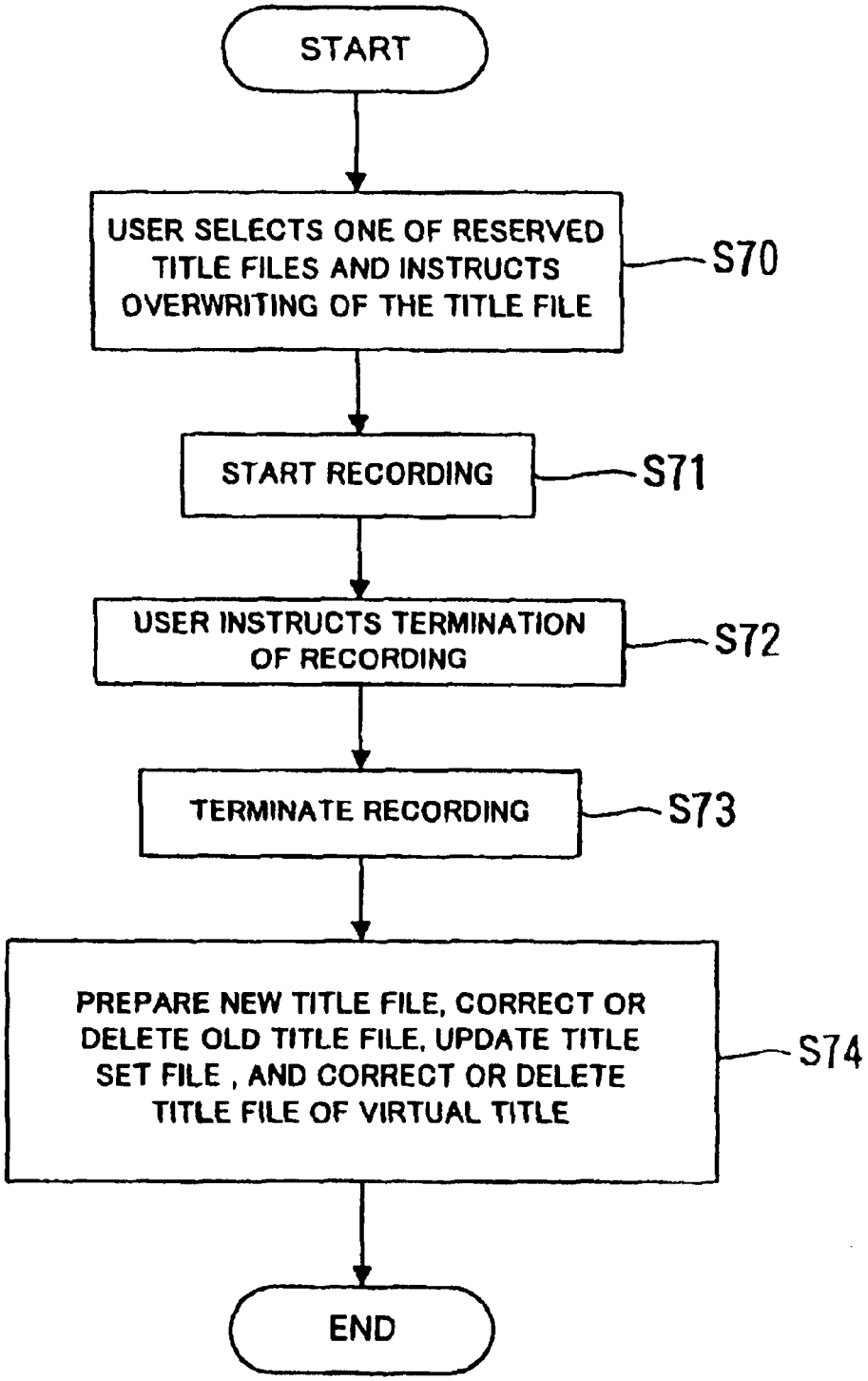
FIG. 14 is a flowchart showing an overwriting operation of the data recording/reproduction/editing system.

As shown in FIG. 14, the user selects one of the reserved title files and instructs overwriting of data on the thus-selected title file by way of the external instruction section 30 (S70). In this case, in order to effect overwriting, an original file is selected. Further, in order to enable data to be written over at any point of the title file, the recording/reproduction/editing system A may be configured so that the user can select a recording start position.

Recording of data is now carried out (S71). If no recording start position is specified, data are recorded on the first container linked to the title file. Subsequently, data are recorded in containers in the sequence indicated by the link data pertaining to the title file.

When the user instructs termination of recording (S72), recording of data is completed (S73).

A title file for the newly-recorded AV data is produced, and the title file to be overwritten is corrected or deleted (S74). Further, the title set file is updated, and a virtual file which refers to the thus-overwritten title file is corrected or deleted (S74).

Figure 15:
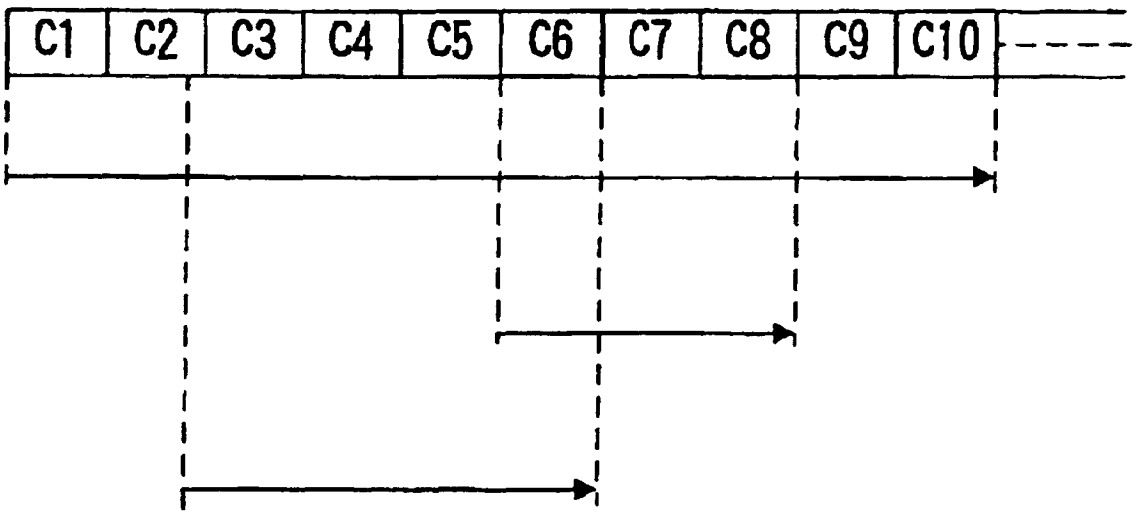
FIG. 15 is a descriptive view showing the configuration of respective title files for describing the overwriting operation of the data recording/reproduction/editing system.

Specific processing will now be described by reference to FIG. 15. In FIG. 15, the zero-th title file is an original file and is linked to containers C1 to C10. The first title file is produced through editing and refers to containers C6 to C8.

The following explanation is based on the condition that the user instructs overwriting of the zero-th title file (S70) and overwriting of data from container C3; specifically, the explanation is based on the condition that the user instructs sequential recording of data from container C3 to container C6.

Newly recorded AV data are recorded in containers C3 to C6, and a new title file; that is, a second title file, is produced (S74). Address data serving as link data pertaining to the second title file are stored in containers C3 to C6. A special symbol representing a final container is embedded in the position of a pointer of address data pertaining to container C6.

In the zero-th title file, AV data are written over containers C3 to C6, whereby the address data pertaining to containers C3 to C6 are deleted. As a result, address data pertaining to container C7 comes to fall next to address data pertaining to container C2. In association with generation of the new second title file, data pertaining to the second title file are written into the title set file 202, whereby the title set file 202 is updated. Since the AV data of container C6 to which the first title file refers are overwritten, the address data pertaining to container C6 are deleted, with the result that address data pertaining to container C7 come to fall at the head of the first title file. In this way, specification of newly-recorded AV data can be prevented from entering into the existing link data.

In a case where AV data are written over up to container C10, since container C2 is the final container of the zero-th title file, a special symbol representing a final pointer is embedded in the position of the address data pertaining to container C2. In this case, all the containers to which the first title file refers are overwritten, and hence the first title file is deleted.

If, of the pointers of the existing title files, new AV data are written over pointers which are spaced at intervals, the overwritten pointers are packed. More specifically, the title file is reconfigured by sequentially moving the pointers, which are not overwritten, to higher hierarchical levels so as to form a consecutive group of pointers and by embedding a special symbol representing a final pointer in a position subsequent to the group of pointers. In containers which are shown in FIG. 15 and taken as an example, if data are written over containers C3, C5, and C7, in this sequence, address data pertaining to container C4 are moved so as to fall next to address data pertaining to container C2 in the zero-th title file.

Further, the pointer of the title file may be utilized as a time table. A time required for recording AV data in a container is set to a predetermined time. The only requirement is to count pointers at the time of a fast-forwarding operation, a rewinding operation, and a time search operation. For example, if a time required for recording data in a single container assumes a value of two seconds, a container in which data will be recorded after lapse of ten seconds can be searched by finding only the fifth pointer.

If the time required for recording data in a container assumes a value of one second or less, pointers can also be utilized for indicating a time during recording and reproduction operations. For example, in a case where a count time is displayed every second at the time of recording or reproduction, one second is counted only when a pointer is detected. If the time required for recording data into a container assumes a value of 0.5 seconds, one second is counted only when two pointers are detected.

In order to ensure seamless recording or reproduction of data, the data recording/reproduction/editing system A performs the following processing.

Given that the minimum transfer rate of the data recording/reproduction/editing system A is Be, a bit rate at which AV data are reproduced is Bd, a worst value of a jump (seek) time is Tj, a time during which the disk 40 waits for rotation is Tr, an expected time required for shock resistance is Tp, a maximum time required for correcting errors in the AV data that have been read is Te, and the amount of storage on a container is C, recording or reproduction of AV data is performed so as to satisfy the relational expression (Be−Bd) *Ts>Bd*Tw. In other words, recording and reproduction of AV data are performed such that the product of (Be−Bd) and Ts becomes greater than the product of Bd and Tw, where Ts=C/Be, Tw=Tj+Tr+Tp+Te, and Be>Bd.

Here, Tj represents the maximum time required for the optical head to jump between the inner periphery and the outer periphery of a recordable region of the disk 40. The distance between the inner periphery and the outer periphery of a recordable region of the disk corresponds to the maximum jump distance. Shock resistance is ensured beforehand as a time during which the head 17 is unable to perform any recording or reproduction operation if physical impact is imparted to the head 17. Tp corresponds to an expected time which is ensured beforehand and includes the time for attaining shock resistance. ECC (error correction code) and EDC (error detecting code) processing operations are required before data to be actually stored in the buffer memory 26 are obtained from actual data which are read from the disk 40 after jumping of the head 17. For this reason, the worst value (Te) of a group delay time required for the ECC and EDC processing operations is employed as a factor of determining Tw. In short, Tw represents a time required from the time the head has made a maximum jump over the disk 40 to the time first actual data are acquired.

Recording and reproduction of data are carried out on the basis of the minimum rotation rate Be satisfying the foregoing relational expression, the worst value Tj of the jump (seek) time, the worst value Tr of the rotational latency, the expected time tp including the time for attaining shock resistance, the maximum time Te required for correcting data which are read, the reproduction bit rate Bd, and the amount C of storage on a container.

Figure 16:
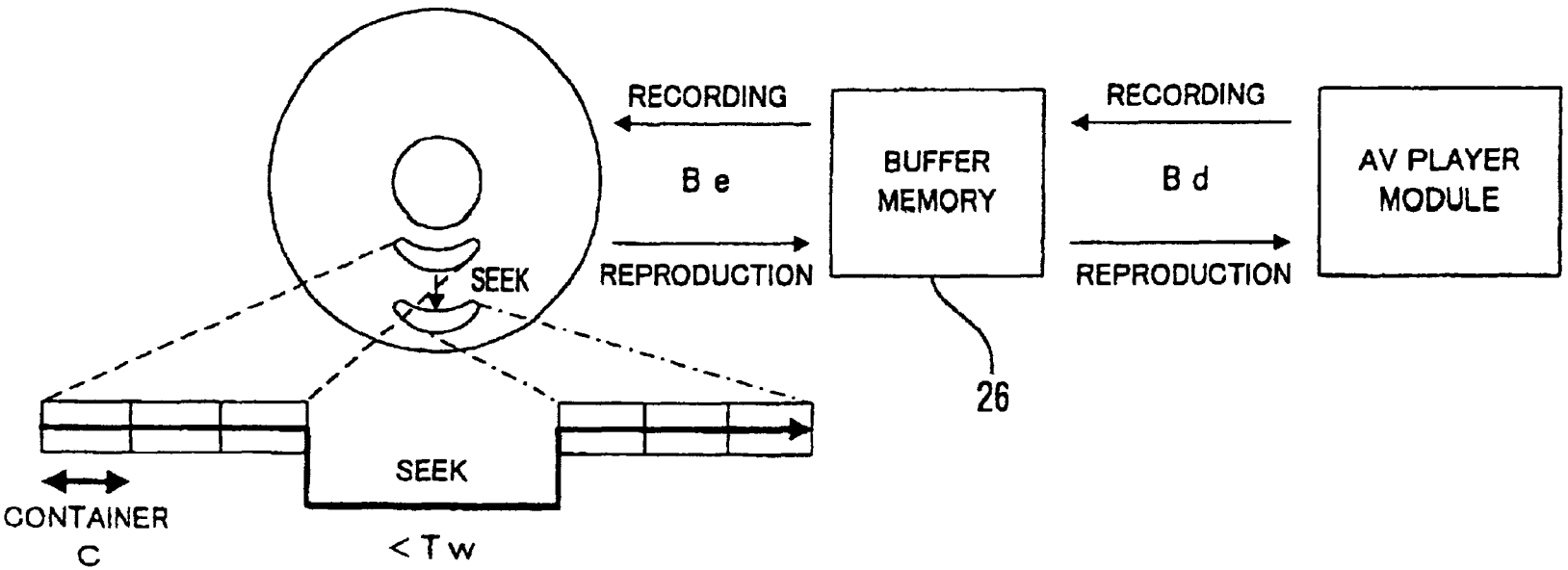
FIG. 16 is a descriptive view for describing assurance of seamless reproduction and recording operations of the data recording/reproduction/editing system.

More specifically, AV data are written in the buffer memory 26 at the bit rate Bd. Simultaneously, the AV data are read from the buffer memory 26 at the bit rate Be, and the thus-read AV data are sent to the magnetic head drive circuit 12 (see FIG. 16). When the AV data are recorded on the disk 40, the AV data are sequentially recorded in units, each unit comprising the amount C of storage on a container. The AV player module shown in FIG. 16 is included in the record signal processing section 10 or the reproduction signal processing section 22 shown in FIG. 1.

Figure 17:
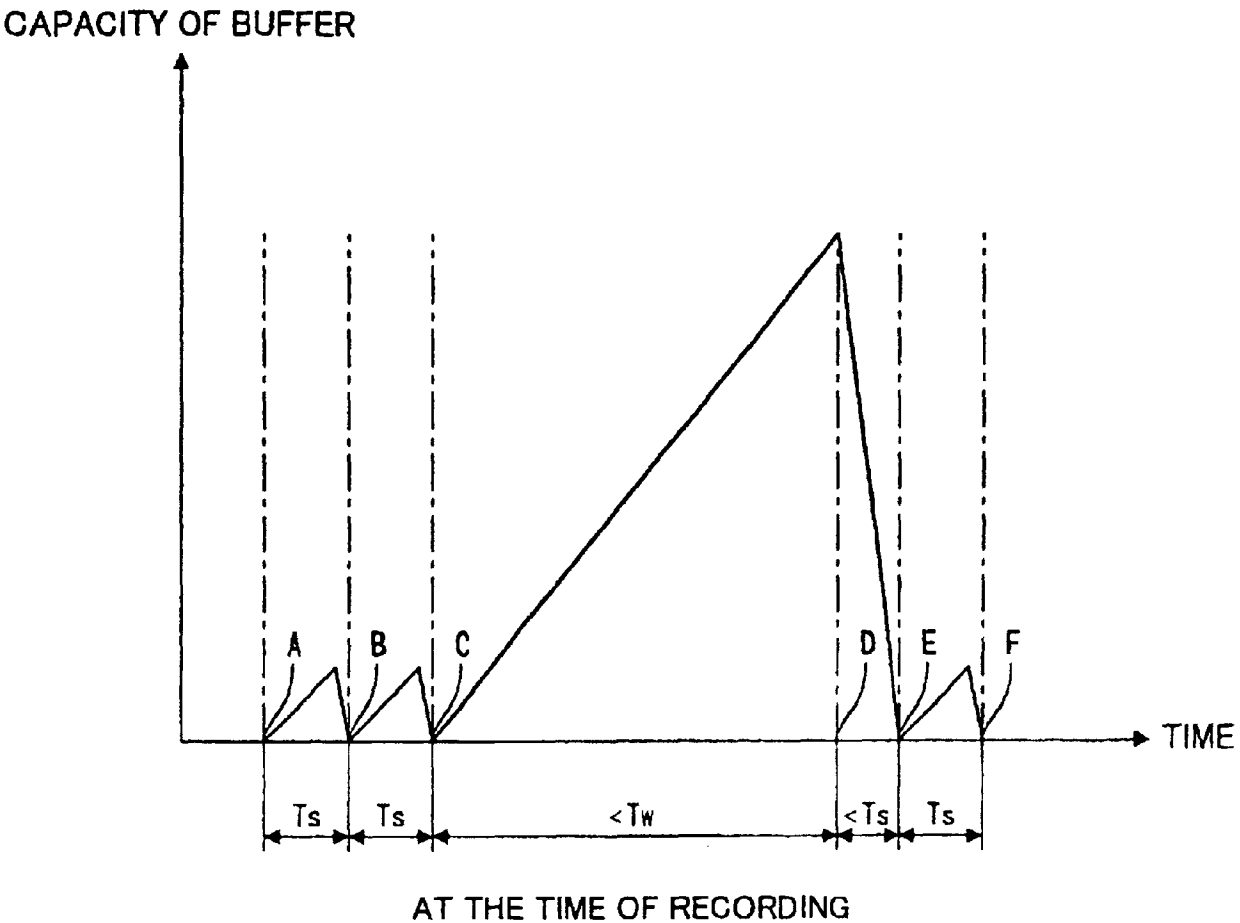
FIG. 17 is descriptive view for describing variations in the volume of buffer at the time of a recording operation.

As mentioned above, the relationship Be>Bd is maintained, and if a plurality of containers are sequentially recordable, variations arise in the amount of buffer during period Ts in which AV data are recorded in arbitrary containers, such as those appearing in period AB, period BC, and period EF. In period AB, period BC, and period EF shown in FIG. 17, the amount of buffer is illustrated to drop after exhibiting an increase. In reality, data are written into the buffer memory 26 simultaneous with reading of data from the buffer memory 26. Since Be>Bd, all the AV data that are written into the buffer memory 26 during period Ts are recorded on the disk 40.

If a plurality of containers are not continuously recordable, the head 17 must be moved so as to jump over unrecordable containers to recordable containers. At the time of jump, AV data are written into the buffer memory 26, but naturally the AV data are not written into the disk 40. Because of the relational expression Tw=Tj+Tr+Tp+Te, the time required from the time the head 17 is moved to an arbitrary region in the recordable region of the disk 40 to the time first actual data are acquired does not exceed Tw. The maximum jump time corresponds to Tw. Because of a relationship (Be−Bd)*Ts>Bd*Tw, even if the head 17 is jumped while writing AV data into the disk 40 is disabled only during period Tw, all the AV data that have been stored during period Tw can be written into a container, to which the head 17 is jumped, within the period of Ts. This can be derived as follows; namely, Bd*Tw on the right side of the relational expression represents the amount of data stored in the buffer memory 26 during the jump time; (Be−Bd)*Ts on the left side of the relational expression represents a difference between the amount of data output from the buffer memory 26 during period Ts and the amount of data input to the buffer memory 26 during period Ts; and (Be−Bd)*Ts>Bd*Tw. (1−Bd/Be)*C is derived by moving (Be−Bd)Ts to the left side of the expression. Since Bd<Be, 1−Bd/Be<1. Further, since Bd*Tw inevitably becomes smaller than C, the amount of data corresponding to Bd*Tw can be recorded into the container. At the time of jumping of the head 17, a variation similar to that which has arisen in period CD shown in FIG. 17 arises in the amount of buffer. Further, during period Ts after jumping of the head 17, a variation similar to that which has arisen in period DE arises in the amount of buffer. A recording period comprises any of periods; namely, period Ts in which data are written into the disk 40, a period (<Tw) during which the head 17 jumps to a recording position on the disk 40, and a period (<Ts) during which the data stored in the buffer memory 26 at the time of jumping of the head are written.

The disk 40 on which the AV data are recorded in the foregoing manner is imparted with a data format satisfying the relational expression (Be−Bd)*Ts>Bd*Tw.

Figure 18:
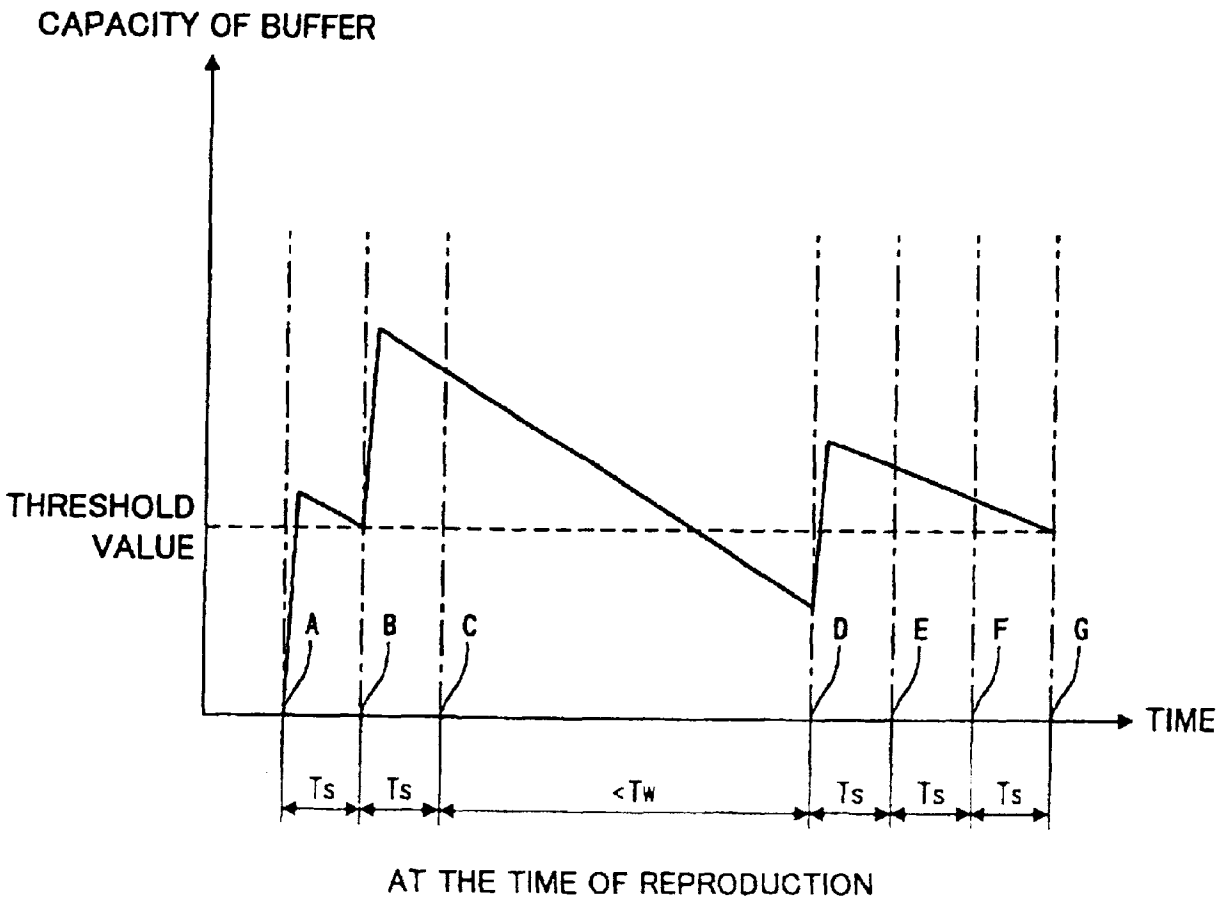
FIG. 18 is a descriptive view for describing variations in the volume of buffer at the time of a reproduction operation.

At the time of reproduction, AV data are read from the disk 40 at the bit rate Be, and the thus-read AV data are written into the buffer memory 26. Simultaneously with writing of the AV data, the AV data are transferred from the buffer memory 26 to the reproduction signal processing section 22 at the bit rate Bd (see FIG. 16). At this time, a threshold value such as that shown in FIG. 18 is determined beforehand. The threshold value corresponds to the amount of data stored in the buffer memory 26 during period Ts [i.e., (Be−Bd)*Ts].

If the amount of data remaining in the buffer memory 26 is smaller than the threshold value, the AV data are output from the buffer memory 26 to the reproduction signal processing section 22, and the AV data are read from the disk 40 at the bit rate Be. At points in time A, B, and D shown in FIG. 18, the amount of data remaining in the buffer memory 26 becomes lower than the threshold value, and hence the AV data are read at the bit rate Be. More specifically, In periods AB, BC, and DE shown in FIG. 18, the amount of buffer is illustrated to drop after exhibiting an increase. In reality, data are written into the buffer memory 26 simultaneously with reading of data from the buffer memory 26, and after lapse of time period Ts data are stored in the buffer memory 26 in an amount of (Be−Bd)*Ts.

In contrast, when the amount of data remaining in the buffer memory 26 exceeds the threshold value, AV data are output from the buffer memory 26 to the reproduction signal processing section 22, but reading of AV data from the disk 40 is suspended. So long as the amount of data exceeding (Be−Bd)*Ts remains in the buffer memory 26, even if the head 17 jumps, the maximum amount of data transferred from the buffer memory 26 becomes BdTw. Therefore, so long as the requirement (Be−Bd)*Ts>Bd*Tw is satisfied, the amount of data required for reproduction will remain sufficient. Further, since reading of data is suspended, as mentioned above, the amount of buffer memory 26 can be reduced the smallest possible amount. At points in time C, E, and F, the amount of data remaining in the buffer memory 26 exceeds the threshold value, and hence data are output from only the buffer memory 26 during period between CD, period Ts between EF, and period Ts between FG. Period CD shown in FIG. 18 represents jumping of the head 17 from one point of reproduction to another point of reproduction. The maximum time required for jumping action in period CD corresponds to Tw. As shown in FIG. 18, a reproducing period comprises any of the following periods; namely, a period Ts during which data are read from the disk 40, and a period (<Tw) during which the head 17 jumps to a reproduction position on the disk 40.

As can be seen from FIG. 18, if jump time; that is, the time required from the time the head 17 is jumped to the time first actual data are acquired, is shorter than Tw, AV data are constantly reserved in an amount greater than (Be−Bd)*Ts in the buffer memory 26. Accordingly, reproduction data output from the buffer memory 26 during period Tw can be ensured at all times. As has been described above, since jump time does not exceed Tw, data for reproduction will not run out. Specifically, as can be seen from FIG. 18, data are stored in an amount of (Be−Bd)*Ts is in the buffer memory 26 during period Ts. Since (Be−Bd)*Ts is greater than Bd*Tw, the amount of data is sufficient to be output during period Tw.

The maximum amount of data remaining in the buffer memory 26 is 2*(Be−Bd)*Ts, and hence the buffer memory 26 must have a volume capable of storing such data. Given that the amount of remaining data at a break between periods Ts or at the time of processing of data in units, each unit having a predetermined amount, is (Be−Bd)*Ts, AV data are further read from the disk 40, with the result that the amount of remaining data assumes the value 2*(Be−Bd)*Ts.

As mentioned above, seamless recording or reproduction of data among arbitrary containers is ensured, and seamless virtual edition of data is also ensured.

In a case where AV data are recorded or reproduced on a per-container basis, seamless recording or reproduction of data can be ensured. In turn, units for editing must be limited to units of containers. In order to enable editing of data from an arbitrary point, more detailed control of the data recording/reproduction/editing system A may be achieved.

Figure 19:
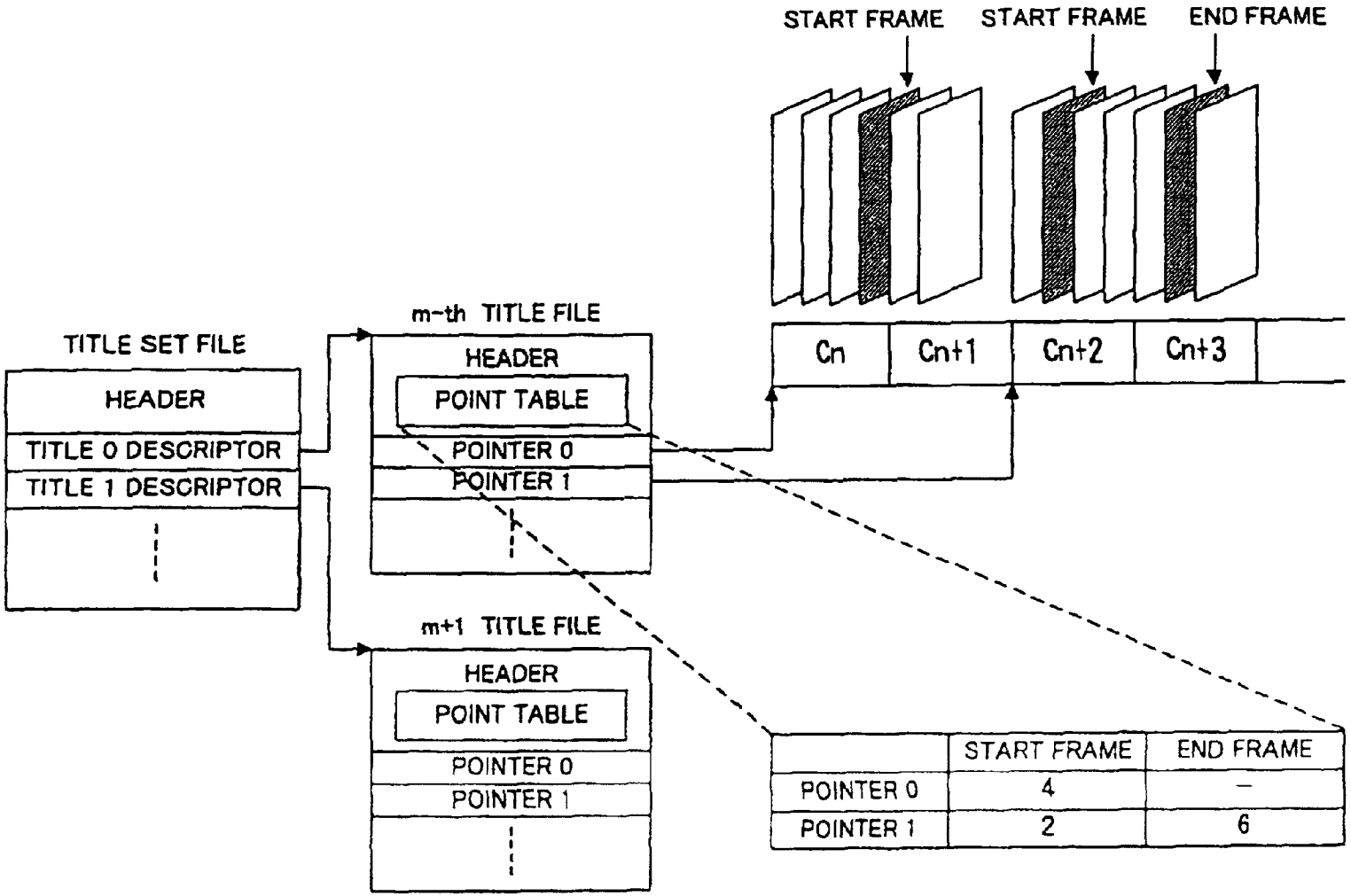
FIG. 19 is a descriptive view showing the configuration of a management data table for describing another feature of the data recording/reproduction/editing system.

As shown in FIG. 19, a point table is provided in the header data pertaining to the title files. In this point table, there are written data pertaining to a start frame (reproduction start frame) and an end frame (reproduction end frame) with regard to each of points.

In the case of an m-th title file shown in FIG. 19, the container designated by pointer 0 has start frame 4. The container designated by pointer 1 has start frame 2 and end frame 6. In a case where container Cn is reproduced according to address data pertaining to pointer 0, data located at the fourth frame of container Cn are reproduced. In a case where container Cn+2 is reproduced according to address data pertaining to pointer 1, data located between the second frame and the sixth frame of container Cn+2 are reproduced. In the flowchart shown in FIG. 7, the fourth frame of container Cn is specified as the editing start position; the final frame of the same is specified as the editing end position; the second frame of container Cn+2 is specified as the editing start position; and the sixth frame of the same is specified as the editing end position.

In this case, since data are reproduced at the same timing as that of the AV data, frames other than edited frames of the container are not displayed during reproduction. For example, in the case of pointer 0 of the m-th title file shown in FIG. 19, AV data located in the first through third frames are decoded but not displayed. AV data are displayed only after processing has progressed to the timing of the fourth frame. The point table is only for the purpose of controlling the timing at which AV data are displayed. In this regard, although data are processed in a seamless manner, seamless display of AV data among linked containers is not ensured.

As a result, the user can edit AV data through use of arbitrary frames, thus preventing unnecessary display of AV data or a failure to display necessary AV data.

Although in the previous embodiment the data recording/reproduction/editing system A has been described to have the point table including frame data for each of points, time-stamp data or the number of bytes following the head of a container may be used in place of the point table.

Although the previous embodiment has described that AV data are recorded, reproduced, and edited on a per-container basis and that the address data pertaining to containers, which are to be linked, are stored in the title file, the present invention is not limited to such an embodiment and may employ another method.

Figure 20:
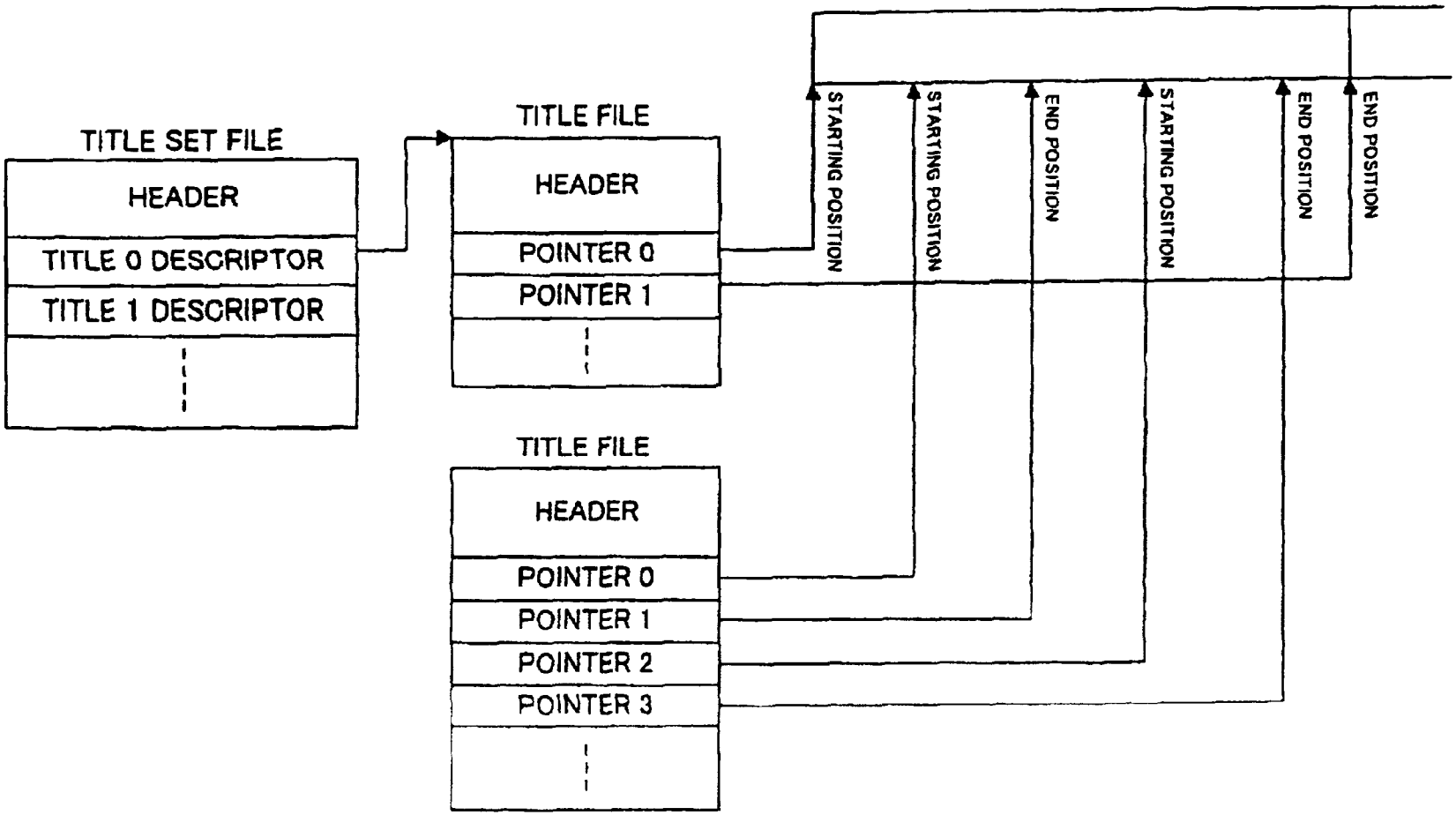
FIG. 20 is a descriptive view showing another configuration of the data management table.
Figure 21:
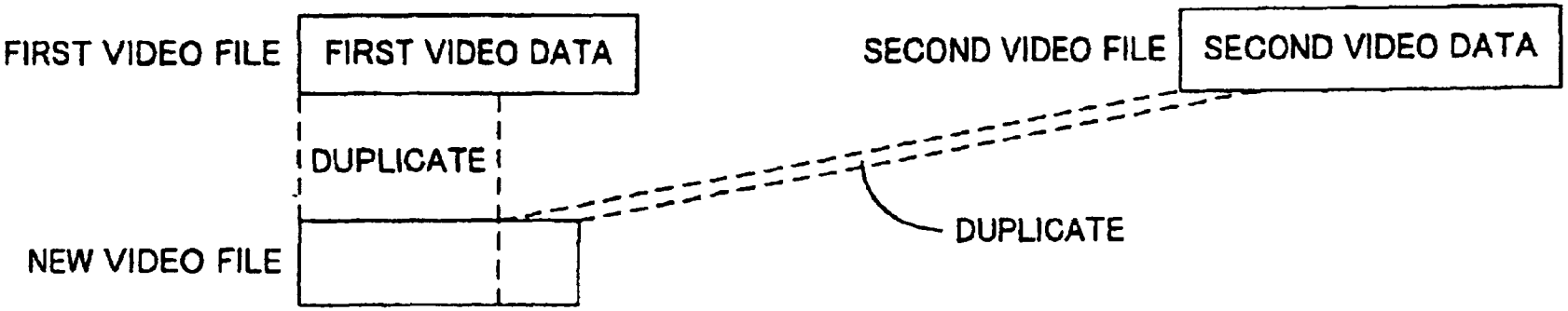
FIG. 21 is a descriptive view for describing an editing method employed in a conventional video system.

The start and end positions of each of data blocks to be linked are stored sequentially. As shown in FIG. 20, data pertaining to the start and end positions of linked containers are sequentially stored in each of the title files. As data pertaining to the start and end positions, address data pertaining to corresponding sectors, for example, are stored in the form of logical addresses. At the time of generation and correction of a title file during the recording, editing, deletion, and reproduction operations shown in FIGS. 6 through 11, data pertaining to the start and end positions are stored in the title file. At this time, the link count table stores the number of times title files refer to an individual sector. In this case, the sector acts as a unit recording region.

As mentioned above, in place of data pertaining to the start and end positions of sectors, which are to be linked, these may be stored a start position and the amount of data which have been stored from the start position. Even in this case, the link count table stores, for each sector, the number of times title files refer to an individual sector. Even in these two cases, AV data are processed in the same manner as in the case where data are processed on a per-container basis, except that sectors, which are to be linked, are specified in a different way.

In a case where the start and end positions of linked sectors are stored in the title file or a case where the start position of a linked sector and the amount of data which have been stored from the start position are stored in the title file, the present invention has the advantage of enabling editing of AV data at desired positions. In this case, however, seamless recording and reproduction of AV data is not ensured. Specifically, unlike the volume of a container, the unit volume of data to be continuously recorded is not specified, and hence the foregoing relational expression cannot be satisfied, with the result that seamless reproduction or recording of data is not ensured.

As mentioned above, in the data recording/reproduction/editing system A according to the embodiment, a title file having link data stored therein is prepared at the time of recording of AV data. When the AV data are edited, the title file of the AV data is edited, and another title file having another link data stored therein is stored. In other words, a portion of the title file can be shared among other title files. In a case where a digest or a short version is produced from AV data, there is no necessity for use of two VCRs, which would otherwise be required in the case of a conventional data recording/reproduction/editing system. Further, there is no necessity for ensuring a storage area for use in recording a duplicate of AV data. As mentioned above, an original file and a virtual file are stored, thus enabling reproduction of AV data in various modes such as a full-reproduction mode, a digest mode, and a short version mode.

Although the embodiment of the present invention has been described above, the present invention is not limited to such an embodiment and may be subjected to various modifications. For example, the previous embodiment has described the data pertaining to the management data table being rewritten. However, the present invention is not limited to such an embodiment. Data pertaining to the management data table may be rewritten every time a type of processing, such as recording, is completed. Alternatively, a new title file may be prepared every time recording of AV data is started.

Further, the foregoing embodiment has described data of the management data table being recorded in the management region formed along the innermost periphery of the disk 40. However, the present invention is not limited to such an embodiment, and the data of the management data can be recorded at an arbitrary position on the disk 40 and may be recorded in the user region; that is, a data region. According to the present invention, the amount of data stored in the management data table can be changed on the basis of the number of title files or the number of pointers provided in the title file, which in turn makes it impossible to define the size of the management region for storing the management data table. To prevent this, the management region sufficient for storing the amount of data stored in the user region on the disk 40 is ensured, and the data pertaining to the management data table are stored. In the event the management region becomes full or the amount of data remaining in the management region becomes smaller than a predetermined threshold value, an empty region in the user region is ensured as a new management region. The size of the management region is set beforehand in consideration of a margin. Further, the data recording/reproduction/editing system may be arranged such that, in the event the volume of a new title file to be recorded exceeds the volume of the management region, generation or recording of the new title file may be disabled unless an existing title file is deleted.

Although the foregoing embodiment has been described by reference to a case where AV data are taken as principal data, the present invention is not limited to such an example; the foregoing embodiment may also be applied to solely video data or solely audio data.

INDUSTRIAL APPLICABILITY

As has been mentioned, in a data recording system and a data recording method according to the present invention, when primary data are recorded, a file (original file) is prepared. Another file (a virtual file) is prepared through editing of the file. At least a portion of the primary data can be accessed by a plurality of files. Editing of the primary data, such as preparation of a digest of the primary data, becomes feasible, thereby eliminating a necessity for use of a reproduction apparatus and a recording apparatus. The data recording system manages only the plurality of files, which in turn eliminates a necessity for ensuring a region for use in recording a duplicate of the primary data.

Further, in connection with the recording medium according to the present invention, data are reproduced according to the file (original file) prepared at the time of recording of primary data or according to the file (virtual file) prepared by editing the file, thereby enabling reproduction of data in various modes, such as a full-reproduction mode or a digest reproduction mode. Further, the data are managed in the form of files, and hence the recording region on the recording medium can be effectively utilized.

What is claimed is:

1. A data recording system for recording primary data, comprising:

a recording section for recording primary data on a recording medium, in which primary data are recorded in each of a plurality of unit recording regions of a predetermined length into which a recording area of the recording medium is divided; and a control section for generating an original file when the recording section has recorded the primary data on the recording medium, the original file storing link data formed as a result of sequential arrangement of address data directly pertaining to the unit recording regions in which the primary data have been recorded by the recording section, as well as for generating a virtual file by means of editing the original file in accordance with a user's instruction, the virtual file storing link data formed as a result of sequential arrangement of address data directly pertaining to the unit recording regions.

2. The data recording system as defined in claim 1, wherein the control section prepares a virtual file by editing the original file and/or the virtual file in accordance with a user's instruction.

3. A data recording system for storing primary data on a medium, comprising:

a recording section for recording primary data on a recording medium, in which primary data are recorded in each of a plurality of unit recording regions of a predetermined length into which a recording area of the recording medium is divided; and a control section for generating a file at the time of recording of the primary data, wherein the file stores, in the form of a logical address, link data which are formed by arranging in sequence address data directly pertaining to the unit recording regions in which the primary data have been recorded by the recording section, wherein the control section generates a new virtual file by means of editing the original file that is prepared at the time of recording of the primary data in accordance with a user's instruction and the control section generates a new virtual file by means of editing an existing original file and/or an existing virtual file in accordance with a user's instruction.

4. The data recording system as defined in claim 1, wherein the virtual file comprises at least a portion of address data pertaining to a file which is used as a source for editing.

5. The data recording system as defined in claim 1, wherein the control section prepares a new file on the basis of a plurality of files.

6. The data recording system as defined in claim 1, wherein when any of existing files is deleted, the control section deletes the file, and when a portion of any one of existing files is deleted, the control section deletes from the file one or a plurality of address data sets pertaining to the file.

7. The data recording system as defined in claim 1, wherein the control section prepares a link count table for managing the number of times files refer to each of said unit recording regions, and the control section updates data pertaining to the prepared link count table or pertaining to a link count table read from the recording medium, through editing and/or deletion of the files.

8. The data recording system as defined in claim 7, wherein a unit recording region assigned reference number 0 in the link count table is handled as a recordable region;

when the original file prepared at the time of recording of the primary data or a portion of the original file is deleted, the control section resets to zero the reference number assigned in the link count table to the corresponding unit recording regions to be deleted; and in contrast, when the virtual file prepared by editing the existing file or a portion of the virtual file is deleted, the control section decrements the reference number assigned in the link count table to the corresponding unit recording regions to be deleted.

9. The data recording system as defined in claim 8, wherein when a certain original file or a portion of the original file is deleted, another virtual file referring to the corresponding unit recording region to be deleted is corrected.

10. The data recording system as defined in claim 7, wherein the unit recording region assigned 0 as a reference number in the link count table is handled as a recordable region, and when a certain file is wholly or partially deleted, the control section decrements the reference number assigned in the link count table to the corresponding unit recording regions to be deleted, regardless of whether the file to be deleted is an original file prepared at the time of recording of primary data or a virtual file prepared by editing an existing file.

11. The data recording system as defined claim 1, wherein when overwriting of the entirety of a certain existing file or overwriting of a portion of the file is instructed, the control section prepares a new file with regard to the thus-overwritten primary data, and corrects the link data stored in the existing files or deletes the existing files.

12. The data recording system as defined in claim 1, wherein the control section prepares a title set file for storing the address data pertaining to the files and corrects the title set file in response to preparation or deletion of the files.

13. The data recording system as defined in claim 12, wherein the data recording system writes into the recording medium, at predetermined timing, data pertaining to the generated, corrected, and deleted files, data pertaining to the link count table, and data pertaining to the title set file.

14. The data recording system as defined in claim 13, wherein the data recording system reads from the recording medium data pertaining to the files, the link count table, and the title set file, all of which are written into the recording medium by the data recording system, and stores the thus-read data into a storage section of the data recording system.

15. The data recording system as defined in claim 1, wherein the data recording system records primary data on and reproduces primary data from each of said unit recording regions and data pertaining to a reproduction start frame and a reproduction end frame of each unit recording region are stored in the file.

16. The data recording system as defined in claim 1, wherein the data recording system records primary data on and reproduces primary data from each of said unit recording regions, and given that the minimum rate at which the data recording system transfers data to the recording medium is Be, a bit rate at which data are reproduced is Bd, a time required from the time a head has made a maximum jump over the recording medium to the time first actual data are acquired is Tw, and the amount of storage on the unit recording region of predetermined length is C, recording or reproduction of data is performed so as to satisfy the relational expressions (Be−Bd)*Ts>Bd*Tw, Ts=C/Be, and Be>Bd.

17. The data recording system as defined claim 3, wherein the control section prepares a new file on the basis of a plurality of files.

18. The data recording system as defined in claim 3, wherein when any of existing file is deleted, the control section deletes the file, and when a portion of any one of existing files is deleted, the control section deletes from the file one or a plurality of address data sets pertaining to the file.

19. The data recording system as defined in claim 3, wherein the control section prepares a link count table for managing the number of times files refer to each of said unit recording regions, and the control section updates data pertaining to the prepared link count table or pertaining to a link count table read from the recording medium, through editing and/or deletion of the files.

20. The data recording system as defined in claim 3, wherein when overwriting of the entirety of a certain existing file or overwriting of a portion of the file is instructed, the control section prepares a new file with regard to the thus-overwritten primary data, and corrects the link data stored in the existing files or deletes the existing files.

21. The data recording system as defined in claim 3, wherein the control section prepares a title set file for storing the address data pertaining to the files and corrects the title set file in response to preparation or deletion of the files.

22. The data recording system as defined in claim 3, wherein the data recording system records primary data on and reproduces primary data from each of said unit recording regions, and data pertaining to a reproduction start frame and a reproduction end frame of each unit recording region are stored in the file.

23. The data recording system as defined in claim 3, wherein the data recording system records primary data on and reproduces primary data from each of said unit recording regions, and given that the minimum rate at which the data recording system transfers data to the recording medium is Be, a bit rate at which data are reproduced is Bd, a time required from the time a head has made a maximum jump over the recording medium to the time first actual data are acquired is Tw, and the amount of storage on the unit recording region of predetermined length is C, recording or reproduction of data is performed so as to satisfy the relational expression (Be−Bd)*Ts>Bd*Tw, Ts=C/Be, and Be>Bd.

24. The data recording system as defined in claim 19, wherein a unit recording region assigned reference number 0 in the link count table is handled as a recordable region;

when the original file prepared at the time of recording of the primary data or a portion of the original file is deleted, the control section resets to zero the reference number assigned in the link count table to the corresponding unit recording regions to be deleted; and in contrast, when the virtual file prepared by editing the existing file or a portion of the virtual file is deleted, the control section decrements the reference number assigned in the link count table to the corresponding unit recording regions to be deleted.

25. The data recording system as defined in claim 19, wherein the unit recording region assigned 0 as a reference number in the link count table is handled as a recordable region, and when a certain file is wholly or partially deleted, the control section decrements the reference number assigned in the link count table to the corresponding unit recording regions to be deleted, regardless of whether the file to be deleted is an original file prepared at the time of recording of primary data or a virtual file prepared by editing an existing file.

26. The data recording system as defined in claim 21, wherein the data recording system writes into the recording medium, at predetermined timing, data pertaining to the generated, corrected, and deleted files, data pertaining to the link count table, and data pertaining to the title set file.

27. The data recording system as defined in claim 1, wherein when a certain original file or a portion of the original file is deleted, another virtual file referring to the corresponding unit recording region to be deleted is corrected.

28. The data recording system as defined in claim 26, wherein the data recording system reads from the recording medium data pertaining to the files, the link count table, and the title set file, all of which are written into the recording medium by the data recording system, and stores the thus-read data into a storage section of the data recording system.

29. The data recording system as defined in claim 1, wherein the address data pertaining to the primary data are arranged in sequence of reproduction of the corresponding unit recording regions of the primary data.

30. The data recording system as defined in claim 1, wherein the predetermined length of each of the unit recording regions comprises a number of bits corresponding to an amount of data whose recording and reproduction requires a few seconds.

*31. A data recording and reproducing system for recording and reproducing primary data on a rewritable recording medium, comprising:*

*a head to write and to read out the primary data on the recording medium;*

*a recording section for recording the primary data on the recording medium, the recording section making the head to jump to a region to which the primary data is written; and*

*a reproducing section for reproducing the primary data on the recording medium, the reproducing section making the head to jump to a region from which the primary data is read out,*

*wherein the recording section and the reproducing section respectively record and reproduce the primary data in unit recording regions, into which a recording area of the recording medium is divided, according to the formulas:*

$$(Be-Bd)Ts>BdTw,$$

$$Ts=C/Be, \text{ and}$$

$$Be>Bd,$$

*wherein Be is minimum data transmission rate to the recording medium, Bd is reproduction bit rate of the primary data, Tw is time interval from timing when the head starts jumping a longest distance on the recording medium to timing when a first reproduction data of the primary data is obtained after the jumping and C is a capacity of the unit recording region.*

*32. A reproducing system for reproducing primary data on a recording medium, comprising:*

*a head to read out the primary data on the recording medium;*

*a reproducing section for reproducing the primary data on the recording medium, the reproducing section mak-*

*ing the head to jump to a region from which the primary data is read out,*

*wherein the primary data are recorded in unit recording regions, into which a recording area of the recording medium is divided,*

*the reproducing section reproduce primary data according to following formulas:*

$$(Be-Bd)Ts>BdTw,$$

$$Ts=C/Be, \text{ and}$$

$$Be>Bd,$$

*wherein Be is minimum data transmission rate to the recording medium, Bd is reproduction bit rate of the primary data, Tw is time interval from timing when the head starts jumping a longest distance on the recording medium to timing when a first reproduction data of the primary data is obtained after the jumping and C is a capacity of the unit recording region.*

*33. A method of recording and reproducing primary data on a rewritable recording medium, comprising:*

*recording and reproducing the primary data in unit recording regions, into which a recording area of the recording medium is divided,*

*wherein the recording and the reproducing of the primary data respectively are carried out according to following formulas:*

$$(Be-Bd)Ts>BdTw,$$

$$Ts=C/Be, \text{ and}$$

$$Be>Bd,$$

*wherein Be is minimum data transmission rate to the recording medium, Bd is reproduction bit rate of the primary data, Tw is time interval from timing when a longest jump of reproduction position on the recording medium starts to timing when a first reproduction data of the primary data is obtained after the jump and C is the capacity of the unit recording region.*

*34. A data recording system for recording primary data on a recording medium, comprising:*

*a recording section for recording primary data on the recording medium, in which primary data are recorded in each of a plurality of unit recording regions; and*

*a control section for generating an original file when the recording section has recorded the primary data on the recording medium, the original file storing link data formed as a result of sequential arrangement of address data pertaining to the unit recording regions in which the primary data have been recorded by the recording section,*

*as well as for generating a virtual file by means of editing the original file in accordance with a user's instruction, the virtual file storing link data formed as a result of sequential arrangement of address data pertaining to the unit recording regions;*

*wherein the virtual file stores time-stamp data indicating reproduction start timing and reproduction end timing of the primary data in each unit recording regions linked by the link data of the virtual file.*

*35. A data recording method for recording primary data on a recording medium, comprising the steps of:*

*generating an original file when primary data are recorded in each of a plurality of unit recording regions on the recording medium, the original file storing link data formed as a result of sequential arrangement of address data pertaining to the unit recording regions in which the primary data have been recorded;*

*generating a virtual file by means of editing the original file in accordance with a user's instruction, the virtual file storing link data formed as a result of sequential arrangement of address data pertaining to the unit recording regions; and*

*storing time-stamp data in the virtual file, the time stamp data indicating reproduction start timing and reproduction end timing of the primary data in each unit recording regions linked by the link data of the virtual file.*

* * * * *

UNITED STATES PATENT AND TRADEMARK OFFICE

CERTIFICATE OF CORRECTION

PATENT NO. : RE41,082 E
APPLICATION NO. : 11/580314
DATED : January 19, 2010
INVENTOR(S) : Yuichi Kanai et al.

It is certified that error appears in the above-identified patent and that said Letters Patent is hereby corrected as shown below:

In Claim 32, Column 29, Lines 14-15;
Change

"Be is minimum data transmission rate to the recording medium"

To be

--Be is minimum data transmission rate from the recording medium--

Signed and Sealed this
Third Day of January, 2012

David J. Kappos

David J. Kappos
*Director of the United States Patent and Trademark Office*